(12) United States Patent  
Libman

(10) Patent No.: US 7,774,230 B2  
(45) Date of Patent: *Aug. 10, 2010

(54) SYSTEM, METHOD, AND COMPUTER PROGRAM PRODUCT FOR SELECTING AND PRESENTING FINANCIAL PRODUCTS AND SERVICES

(75) Inventor: Richard Marc Libman, Scottsdale, AZ (US)

(73) Assignee: Phoenix Licensing, LLC, Scottsdale, AZ (US)

( * ) Notice: Subject to any disclaimer, the term of this patent is extended or adjusted under 35 U.S.C. 154(b) by 1867 days.

This patent is subject to a terminal disclaimer.

(21) Appl. No.: 10/406,636

(22) Filed: Apr. 4, 2003

(65) Prior Publication Data

US 2004/0030626 A1 Feb. 12, 2004

Related U.S. Application Data

(63) Continuation-in-part of application No. 09/592,086, filed on Jun. 12, 2000, now Pat. No. 7,711,599, which is a continuation of application No. 08/834,240, filed on Apr. 15, 1997, now Pat. No. 6,076,072, which is a continuation-in-part of application No. 08/661,004, filed on Jun. 10, 1996, now Pat. No. 5,987,434.

(51) Int. Cl.  
*G06Q 30/00* (2006.01)

(52) U.S. Cl. .............. 705/14.17; 705/14.1; 705/14.25; 705/14.49; 705/14.53; 705/14.66; 705/14.67; 705/14.72; 705/4; 705/35; 705/40

(58) Field of Classification Search .............. 705/14.17, 705/14.1, 14.25, 14.49, 14.53, 14.66, 14.67, 705/14.72, 4, 35, 40

See application file for complete search history.

(56) References Cited

U.S. PATENT DOCUMENTS 4,088,981 A 5/1978 Gott (Continued)

FOREIGN PATENT DOCUMENTS

CA 2282873 3/2001

(Continued)

OTHER PUBLICATIONS

"Click Here for Coverage," Business Week (describing online shopping for insurance), Jun. 1, 1998.

(Continued)

*Primary Examiner*—Raquel Alvarez  
(74) *Attorney, Agent, or Firm*—Berry & Associates P.C.

(57) ABSTRACT

An apparatus and method are provided which use client information from a client to automatically select and present financial products appropriate for the client. The apparatus according to one aspect of the invention comprises an input device for inputting client information relevant to a need by the client for the financial products, for inputting information about the financial products, for inputting ancillary data which excludes the client information and the financial products information, and for inputting decision criteria pertaining to selection from among the financial products. The apparatus still further includes decision making logic circuitry for using the client information, the financial products information, the ancillary information, and the decision criteria to select a subset of the financial products. It further includes an output device for preparing a client communication which identifies the subset of the financial products.

22 Claims, 14 Drawing Sheets

U.S. PATENT DOCUMENTS

| | | | |
|---|---|---|---|
| 4,221,086 A | 9/1980 | Berman | |
| 4,237,799 A | 12/1980 | Berman | |
| 4,567,359 A | 1/1986 | Lockwood | 235/381 |
| 4,751,640 A | 6/1988 | Lucas et al. | |
| 4,752,675 A | 6/1988 | Zetmeir | |
| 4,831,526 A | 5/1989 | Luchs et al. | |
| 5,039,075 A | 8/1991 | Mayer | 270/1.1 |
| 5,124,911 A | 6/1992 | Sack | |
| 5,220,501 A | 6/1993 | Lawlor et al. | |
| 5,245,535 A | 9/1993 | Weiss et al. | |
| 5,319,542 A | 6/1994 | King, Jr. et al. | |
| 5,388,165 A | 2/1995 | Deaton | |
| 5,446,653 A | 8/1995 | Miller et al. | |
| 5,446,891 A | 8/1995 | Kaplan et al. | |
| 5,453,601 A | 9/1995 | Rosen | |
| 5,455,407 A | 10/1995 | Rosen | |
| 5,502,636 A | 3/1996 | Clarke | |
| 5,504,675 A | 4/1996 | Cragun et al. | |
| 5,523,942 A | 6/1996 | Tyler et al. | |
| 5,537,314 A | 7/1996 | Kanter | |
| 5,550,746 A | 8/1996 | Jacobs | |
| 5,557,518 A | 9/1996 | Rosen | |
| 5,576,951 A | 11/1996 | Lockwood | |
| 5,592,375 A | 1/1997 | Salmon et al. | |
| 5,619,558 A * | 4/1997 | Jheeta | 379/92.01 |
| 5,621,797 A | 4/1997 | Rosen | |
| 5,640,835 A | 6/1997 | Muscoplat | |
| 5,642,419 A | 6/1997 | Rosen | |
| 5,644,727 A | 7/1997 | Atkins | |
| 5,651,280 A | 7/1997 | Park | |
| 5,655,085 A | 8/1997 | Ryan et al. | |
| 5,659,165 A | 8/1997 | Jennings et al. | |
| 5,671,280 A | 9/1997 | Rosen | |
| 5,671,282 A | 9/1997 | Wolff et al. | |
| 5,673,402 A | 9/1997 | Ryan et al. | |
| 5,687,322 A | 11/1997 | Deaton | |
| 5,699,527 A | 12/1997 | Davidson | |
| 5,703,949 A | 12/1997 | Rosen | |
| 5,710,889 A | 1/1998 | Clark et al. | |
| 5,721,831 A | 2/1998 | Waits | 395/210 |
| 5,732,400 A | 3/1998 | Mandler et al. | |
| 5,745,886 A | 4/1998 | Rosen | |
| 5,761,650 A | 6/1998 | Munsil et al. | |
| 5,774,553 A | 6/1998 | Rosen | |
| 5,787,403 A | 7/1998 | Randle | |
| 5,794,210 A * | 8/1998 | Goldhaber et al. | 705/14 |
| 5,794,218 A | 8/1998 | Jennings et al. | |
| 5,799,097 A | 8/1998 | Rosen | |
| 5,806,057 A | 9/1998 | Gormley et al. | 707/1 |
| 5,819,241 A | 10/1998 | Reiter | |
| 5,819,263 A | 10/1998 | Bromley et al. | |
| 5,822,735 A | 10/1998 | De Lapa et al. | |
| 5,825,856 A | 10/1998 | Porter et al. | |
| 5,844,971 A | 12/1998 | Elias et al. | |
| 5,845,302 A | 12/1998 | Cyman | |
| 5,852,811 A | 12/1998 | Atkins | |
| 5,857,175 A | 1/1999 | Day | |
| 5,866,889 A | 2/1999 | Weiss et al. | |
| 5,878,139 A | 3/1999 | Rosen | |
| 5,890,140 A | 3/1999 | Clark et al. | |
| 5,893,076 A | 4/1999 | Plainfield et al. | |
| 5,895,468 A | 4/1999 | Whitmyer | |
| 5,898,154 A | 4/1999 | Rosen | |
| 5,913,202 A | 6/1999 | Motoyama | |
| 5,920,629 A | 7/1999 | Rosen | |
| 5,926,800 A | 7/1999 | Baronowski | |
| 5,930,764 A | 7/1999 | Melchione et al. | |
| 5,933,811 A | 8/1999 | Angles | |
| 5,953,423 A | 9/1999 | Rosen | |
| 5,963,648 A | 10/1999 | Rosen | |
| 5,963,968 A | 10/1999 | Warmus et al. | |
| 5,966,695 A | 10/1999 | Melchione et al. | |
| 5,974,396 A | 10/1999 | Anderson | |
| 5,978,485 A | 11/1999 | Rosen | |
| 5,987,434 A | 11/1999 | Libman | |
| 6,018,721 A | 1/2000 | Aziz et al. | |
| 6,021,397 A | 2/2000 | Jones | |
| 6,026,370 A | 2/2000 | Jermyn | 705/14 |
| 6,029,153 A | 2/2000 | Bauchner et al. | |
| 6,047,067 A | 4/2000 | Rosen | |
| 6,047,887 A | 4/2000 | Rosen | |
| 6,049,782 A | 4/2000 | Gottesman et al. | |
| 6,055,513 A | 4/2000 | Katz et al. | |
| 6,058,378 A | 5/2000 | Clark et al. | |
| 6,064,969 A | 5/2000 | Haskins | |
| 6,076,068 A | 6/2000 | DeLapa et al. | |
| 6,076,072 A | 6/2000 | Libman | |
| 6,088,686 A | 7/2000 | Walker et al. | |
| 6,122,190 A | 9/2000 | Ooishi | |
| 6,122,625 A | 9/2000 | Rosen | |
| 6,131,810 A | 10/2000 | Weiss et al. | |
| 6,134,532 A | 10/2000 | Lazarus | |
| 6,138,139 A | 10/2000 | Beck | |
| 6,141,666 A | 10/2000 | Tobin | |
| 6,154,527 A | 11/2000 | Porter et al. | |
| 6,175,921 B1 | 1/2001 | Rosen | |
| 6,188,993 B1 | 2/2001 | Eng et al. | |
| 6,205,436 B1 | 3/2001 | Rosen | |
| 6,226,623 B1 | 5/2001 | Schein et al. | |
| 6,233,564 B1 | 5/2001 | Schulze et al. | |
| 6,236,975 B1 | 5/2001 | Boe et al. | |
| 6,272,528 B1 | 8/2001 | Cullen et al. | |
| 6,327,599 B1 | 12/2001 | Warmus et al. | 707/517 |
| 6,330,543 B1 | 12/2001 | Kepecs | |
| 6,332,154 B2 | 12/2001 | Beck | |
| 6,336,095 B1 | 1/2002 | Rosen | |
| 6,349,290 B1 | 2/2002 | Horowitz et al. | |
| 6,354,490 B1 | 3/2002 | Weiss et al. | |
| 6,411,686 B1 | 6/2002 | Porter et al. | |
| 6,453,302 B1 | 9/2002 | Johnson et al. | |
| 6,470,156 B1 | 10/2002 | Sahay | |
| 6,513,019 B2 | 1/2003 | Lewis | |
| 6,611,811 B1 | 8/2003 | Deaton et al. | |
| 6,999,938 B1 | 2/2006 | Libman | |
| 7,072,849 B1 | 7/2006 | Filepp et al. | |
| 2002/0026349 A1 | 2/2002 | Reilly | |
| 2002/0026351 A1 | 2/2002 | Coleman | |
| 2003/0216965 A1 | 11/2003 | Libman | |
| 2004/0030626 A1 | 2/2004 | Libman | |
| 2004/0039588 A1 | 2/2004 | Libman | |
| 2005/0154658 A1 | 7/2005 | Bove | |
| 2006/0004642 A1 | 1/2006 | Libman | |

FOREIGN PATENT DOCUMENTS

| | | |
|---|---|---|
| CA | 2590237 | 3/2001 |
| EP | 0 354 260 A1 | 2/1990 |
| EP | 0 572 281 A1 | 12/1993 |
| EP | 1 071 030 A1 | 1/2001 |
| WO | WO 97/15023 A2 | 4/1997 |
| WO | WO 97/34246 A1 | 9/1997 |
| WO | WO 98/02835 | 1/1998 |
| WO | WO 99/12115 | 3/1999 |
| WO | WO 99/22328 A1 | 5/1999 |
| WO | WO 99/33012 | 7/1999 |

OTHER PUBLICATIONS

"Driving Forces," World Wide Web Winners, WebMaster Magazine (describing Progressive Web site), Aug. 1997.

Burch, Bill, "Companies turn to Internet server management firms," Network World (describing internet server outsourcing), Sep. 26, 1994.

Ellsworth, Jill H., "Staking a claim on the Internet," Nation's Business (small paragraph on page 30 describing SDG Insurance Agency use of on-line forms), Jan. 1996.
Strazewski, Len, "Pioneers on the Web frontier," Rough Notes (describing agency insurance companies going online), May 1996.
Doucette, Nancy, "Aetna's newest location—on the Internet," Rough Notes (describing Aetna Life's electronic storefront), Nov. 1995.
U.S. Appl. No. 09/592,086, filed Jun. 12, 2000, Libman.
"PC Quote partners in world's first virtual conference," Business Wire (describing stock quoting service), Apr. 22, 1996.
"Quicken InsureMarket to Debut With Major Carriers as Partners," Business Wire (describing Inuit partnering with insurance companies), Jun. 11, 1996.
AT&T Universal Gold MasterCard, Apr. 1993, 8 pages.
AT&T Universal MasterCard, Apr. 1993, 8 pages.
Ford Citibank MasterCard billing statements, Feb. 1995, 2 pages.
Stanfed Financial Services, Inc., "BiWeekly Advantage Plan," home mortgage payment acceleration, Jul. 30, 1993, 6 pages.
America's Mortgage Servicing, Inc., unemployment insurance, Mar. 6, 1992, 4 pages.
Richard March Libman, U.S. Appl. No. 09/354,802, filed Jul. 19, 1999, entitled "Automated Reply Generation Direct Marketing System," 84 pages.
Richard March Libman, U.S. Appl. No. 09/592,086, filed Jun. 12, 2000, entitled "Method and Apparatus for Preparing Client Communications Involving Financial Products and Services," 74 pages.
Loeffler, L., "Computer helps marketers romance business clients," Marketing News, American Marketing Association, Chicago, IL, US, vol. 22, No. 6, Mar. 14, 1988, pp. 8-9.
Pitchon, J., "Using the computer to convert advertising enquiries into sales" Best's Review. Property—Casualty Insurance Edition, A.M. Best, US, vol. 83, No. 10, Feb. 1983, pp. 62, 64.
Alpeter V.R., "Market Fax: Computerized Support for Sales and Marketing," Small Business Computers, vol. 7, No. 3, May 1983, pp. 51-53.
Seller and Gray, "A Survey of Database Marketing," Graduate School of Management and Department of Information and Computer Science, University of California, Mar. 1999, pp. 1-45.
Pearson, S., "A Lasting Relationship (Databases in Direct Marketing)" Marketing, Haymarket Publishing, London, GB, vol. 25, No. 8, May 22, 1986, pp. 49-50, 52.
Drennan, Seybold Report, "Variable-Data Printing Comes of Age: Capabilities & Market Demand Coverage," Seybold Report on Publishing Systems, Media, PA, US, vol. 27, No. 2, Sep. 15, 1997, pp. 3-24.
Oppenheimer, N., "Hand-in-Hand Profit for Marketing and Data Processing," Direct Marketing, Hoke Communications, Garden City, NY, US, vol. 48, No. 6, Oct. 1985, pp. 60, 62, 65, 92, 137, 166-167.
Holtman, A. et al., Excerpts from "The New Age of Financial Services Marketing, A Hands-on Applications Guide to Harnessing the Power of Database Marketing," Financial Sourcebooks, Naperville, Illinois, 1992, 59 pages.
Nash, E., Excerpts from "Database Marketing, The Ultimate Marketing Tool," McGraw-Hill, Inc., 1993, 65 pages.
Morrall, K., Customize Your Cross-sell.
Webster's Collegiate Dictionary, Tenth Edition, p. 823.
Summons in *Direct Response Corporation, Response Worldwide Insurance Company, and Warner Insurance Company* v. *LPL Licensing, LLC, and Phoenix Licensing, LLC*, Civil Action No. 2:08-cv-00001-HRH, filed Jan. 3, 2008 in United States District Court, District of Arizona.
Complaint in *Direct Response Corporation, Response Worldwide Insurance Company, and Warner Insurance Company* v. *LPL Licensing, LLC, and Phoenix Licensing, LLC*, Civil Action No. 2:08-cv-00001-HRH, filed Jan. 3, 2008 in United States District Court, District of Arizona.
Corporate Disclosure Statement for *Direct Response Corporation, Response Worldwide Insurance Company, and Warner Insurance Company* v. *LPL Licensing, LLC, and Phoenix Licensing, LLC*, Civil Action No. 2:08-cv-00001-HRH, filed Jan. 3, 2008 in United States District Court, District of Arizona.
Complaint in *State Farm Mutual Automobile Insurance Company* v. *LPL Licensing LLC and Phoenix Licensing LLC*, Civil Action No. 2:2007cv01329, filed Jul. 10, 2007 in United States District Court, District of Arizona.
Complaint in *State Farm Bank, F.S.B.* v. *LPL Licensing, LLC and Phoenix Licensing, LLC*, Civil Action No. 2:2007cv01895, filed Oct. 4, 2007, in United States District Court, District of Arizona.
Complaint in *United Services Automobile Association (USAA)* v. *LPL Licensing LLC and Phoenix Licensing LLC*, Civil Action No. 2:07-cv-01968-FJM, filed Oct. 12, 2007, in United States District Court, District of Arizona.
Complaint in *Citicorp Credit Services Inc.* v. *LPL Licensing, LLC and Phoenix Licensing, LLC*, Civil Action No. 1:2007cv00649, filed Oct. 17, 2007, in United States District Court, District of Delaware.
Complaint in *Discover Products, Inc.* v. *LPL Licensing, LLC and Phoenix Licensing, LLC*, Civil Action No. 1:2007cv05776, filed Oct. 12, 2007, in United States District Court, Northern District of Illinois, Eastern Division.
Complaint in *LPL Licensing LLC and Phoenix Licensing LLC* v. *Chase Manhattan Mortgage Corporation, JP Morgan Chase Bank, N.A., Citibank, N.A., Citibank USA, N.A., CitiBank (South Dakota), N.A., CitiMortgage, Inc., CitiGroup, Inc., Citi Assurance Services Inc., Countrywide Home Loans, Inc., Countrywide Insurance Services, Inc., Discover Financial Services, Inc., Discover Bank, GMAC Mortgage, L.L.C., GMAC Insurance Marketing, Inc., GMAC Bank, Liberty Life Insurance Company, Response Worldwide Insurance Company, Direct Response Corporation, Warner Insurance Company, State Farm Mutual Automobile Insurance Company, State Farm Bank, F.S.B., USAA Federal Savings Bank and USAA Savings Bank*, Civil Action No. 2:2007cv00387, filed Aug. 31, 2007, in United States District Court, Eastern District of Texas, Marshall Division.
Citi Parties' Motion to Consolidate and Transfer under 28 U.S.C. § 1407 in *In re LPL and Phoenix Licensing Litigation—MDL*, Civil Action No. MDL No. 1910, filed Oct. 24, 2007, Judicial Panel on Multidistrict Litigation.
Citi Parties' Brief in Support of Their Motion to Consolidate and Transfer Under 28 U.S.C. § 1407 in *In re LPL and Phoenix Licensing Litigation—MDL*, Civil Action No. MDL No. 1910, filed Oct. 24, 2007, Judicial Panel on Multidistrict Litigation.
Schedule of Actions in *In re LPL and Phoenix Licensing Litigation—MDL*, Civil Action No. MDL No. 1910, filed Oct. 24, 2007, Judicial Panel on Multidistrict Litigation.
*Agena for Windows: Marketing and Sales Campaigns*, Software Brochure, Agena Corporation, 4 pages (Nov. 1995).
*The Agency Manager: Putting Everything on the Desktop with Applied Systems*, Software Brochure, Applied Systems, Los Angeles, California, 12 pages (1994).
SelectQuote Insurances Services Letter and Quote, SelectQuote Insurance Services of San Francisco, California, 8 pages (Jun. 12, 1995).
Sommers/Moreland & Associates, Inc. Letter and Quote, Sommers/Moreland & Associates, Inc., Atlanta, Georgia, 11 pages (Jul. 8, 1995).
Wells Fargo Insurance Services Letter and Sales Literature, Wells Fargo Services, Brisbane, California, 4 pages, (date unknown).
Consumer's Choice Financial Services Company Quote, 1 page (Nov. 28, 1995).
USAA Credit Card Statement Attachment, 2 pages (1997).
AT&T Account Statement, 4 pages (Jan. 1997).
David T. Phillips and Co. Insurance Solicitation, 6 pages (Nov. 17, 1995).
Equiguard Insurance Services, Inc. Solicitation, 6 pages (Nov. 1995).
Cuna Life Insurance Solication, 9 pages (date unknown).
American Savings Bank Solicitation, 5 pages (date appears to be before Feb. 3,1995).
IQ Insurance Quote Services, Inc. Solicitation, 5 pages, Jul. 12, 1995).
TermQuote Life Insurance Solicitation, 3 pages, (date unknown)..
American Airlines AAdvantage Program Statement, 2 pages (Dec. 8, 1995).
Globe Life and Accident Insurance Co. Solicitation, 3 pages, (date unknown).

Jackson National Life Insurance Co. Solicitation, 6 pages (Jul. 1995).
Teachers Insurance and Annuity Association Solicitation, 4 pages (Nov. 1994).
Foley, John, "Market of One: Ready, Aim, Sell!," Information Week, pp. 34-36, 40, 42 and 44 (Feb. 17, 1997).
*Electronic Image Management—EIM*, Brochure from Applied Systems, 6 pages (Jan. 1996).
Premiumatic Plan Life Insurance Solicitation, United Services Life Insurance Company, 4 pages.
SelectQuote Insurances Services Letter and Attachments, SelectQuote Insurance Services of San Francisco, California, 4 pages (Jul. 5, 1995).
SelectQuote Insurances Services Letter and Insurance Application, SelectQuote Insurance Services of San Francisco, California, 7 pages (Jun. 27, 1995).
SelectQuote Insurances Services Letter and Quote, SelectQuote Insurance Services of San Francisco, California, 6 pages (Jun. 12, 1995).
USLife All American Life Insurance Company Account Statement, 1 page (appears to be before Jan. 15, 1997).
KeyMoney Access Account Statement, 2 pages (Jan. 27, 1997).
Wells Fargo Proven Credit Visa Gold Account Statement, 4 pages (Jan. 8, 1997).
Enrico, D., "Dollars and Dialers: Phone company's plan to sell names stirs controversy," *Newsday: The Long Island Newspaper*, Jun. 11, 1990, pp. 3 and 18.
Colonial Penn Life "Happy Birthday" letter, internal date of Apr. 15, 1993.
Colonial Penn Life, 1Q91 GBL Birthday Results as of Dec. 27, 1991.
Colonial Penn Life, 2Q91 GBL Birthday Results as of Dec. 27, 1991.
Colonial Penn Life, 1Q91 Lifechoice Birthday Results as of Dec. 27, 1991.
Colonial Penn Life, 2Q91 Lifechoice Birthday Results as of Dec. 27, 1991.
Colonial Penn Life, "Life Advertising 1986.".
Colonial Penn Life, Memorandum, "4Q90 GLB Birthday Campaign—Input Document," May 8, 1990.
Friedman, A.S., "Turnkey Selling Shifts Away From Quoting," *National Underwriter*, vol. 101, No. 46, National Underwriter Company, 1 page (Nov. 17, 1997).
Goldstein, S., "Firstmerit Offers Customized Insurance Quotes With Checking Statements." *Bank Investment Product News*, vol. III, No. 15, Institutional Investor, Inc., 1 page (Apr. 27, 1997).
*Institutional Telemarketing Services*, Insurance Service Incorporated Brochure, 2 pages (Date believed to be 1986 or 1987).
Larmer, F.L., "'Virtual Agent' Maximizes Small Bank Reach," *National Underwriter*, National Underwriter Company, p. 17 (Apr. 13, 1998).
Lauer, G., "FirstMerit: Using Technology to Personalize Mass-Marketed Life Insurance," *Bank Insurance Marketing*, vol. 6, No. 3, 2 Pages (Summer 1997).
*Newco™ News*, Richard Libman, I.C.A. Insurance Marketing, Inc., 2 pages. (Jun. 1996).
"Virtual Agent Custom Markets Bank Insurance: High-volume, low-touch selling boosts profits," FutureBanker, 1 page (Nov. 1997).
Alliance Mortgage Company Equity Accelerator™ Solicitation Letter with attachments, 3 pages (dated Mar. 10, 1994).
ABN-AMRO Mortgage Acceleration Offer Letter, 2 pages, dated Jul. 29, 2002, earliest date for letters/processes of this type unknown but possibly early 1990's, (unconfirmed).
Berry, J. et al., "Database Marketing: A Potent New Tool for Selling," *Business Week*, pp. 56-62 (Sep. 5, 1994).
"American Express Acquires License for Banc One's Triumph Card Processing Software," *PR Newswire*, PR Newswire Association, Inc., 2 pages (Feb. 6, 1995).
WebMaster, Magazine, World Wide Winners, Aug. 1997.
Burch, Companies Turn to Internet Server Management Firms, Sep. 26, 1994.
Business Wire, Quicken Insure Market to Debut with Major Carriers as Partners, Jun. 11, 1996.
Business Wire, PC Quote Partners in World's First Virtual Conference, Apr. 22, 1996.
Doucette, Aetna's Newest Location—On the Internet, Nov. 1995.
Strazewski, Pioneers on the Web Frontier, May 1996.
Ellsworth, Staking a Claim on the Internet, Jan. 1996.
Holtman, The New Age of Financial Services: A Marketing Hands-On Applications Guide to Harnessing the Power of Database Marketing [divided into 3 parts: 89A, 89B, 89C], 1992.
Nash, Database Marketing [divided into 3 parts: 90A, 90B, 90C], 1993.
Foley, Ready, Aim, Sell, Feb. 1997.
Morrall, Customize Your Cross-Sell, Mar. 1993.
Berry, Database Marketing: A Potent New Tool for Selling, Sep. 5, 1994.
Stephen A. Cone, How KeyCorp Competes with Breakthrough Marketing, Summer 1996.
Kirsten Bell DeTienne; Jeffrey A. Thompson+@, Database Marketing and Organizational Learning Theory: Toward a Research Agenda, 1996.
Beverly Cramp, Reading Your Mind, Feb. 22, 1996.
John J. Harrison, Going Direct Adding Database Marketing to the Mix, May 1996.
John J. Harrison, Using a Database Marketing Strategy to Successfully Market Manage Care, May 1996.
Rob Yoegel, Financial Services Database Marketing, May 1996.
Joseph Radigan, Marketing, Mergers and Megabits, Mar. 1996.
Richard Schroeder, The Prefabricated Financial Plan Can Be Good, Cheap Alternative to Traditional Custom Plans, Nov. 7, 1995.
Takayuki Tachikawa; Makoto Takizawa, Communication Protocol for Group Distributed Objects, 1996.
Andrew Orent, AT&T Helps Financial Institutions Harness the Power of Customer Knowledge, Winter 1995.
Donald C. Mann, Database Marketing—How Its Changing Your Business, Aug. 1990.
Peter Child Robert J. Dennis Timothy D. Gokey Tim I. McGuire Mike Sherman Marc Singer, Can Marketing Regain the Personal Touch, 1995.
Ken Graham, Data Base Marketing with a PC-Based MCIF, Summer 1992.
Lillian Schapiro, How Guardian Got to Grips with Its Database, Feb. 1995.
Chanda Ghose Dasgupta Sanjoy Ghose, Response Modeling: A Segmentation and Targeting Approach for the Life Insurance Industry, 1993.
Liberty Life, Insurance Committee Meeting Minutes, Sep. 24, 1970.
Fred C. Malan, Marketing Options for New Borrowers, Feb. 19, 1986.
Liberty Life, Specialized Marketing Direct Mail Automation, Apr. 3, 1992.
Liberty Life, Liberty Life Direct Mail User Guide, Jul. 8, 1992.
Liberty Life, Direct Response Manual, 1994.
Leo Hertzog, Jr. Bill Korn, Taking Control of Information Fulfillment, Feb. 1992.
Clinton Wilder, Interactive Ads, Oct. 3, 1994.
Clinton Wilder, Interactive Ads—Online and Interactive Services are Providing Advertisers with an Entirely New and Convenient Way to Reach Affluent, Demographically Correct Customers, Oct. 3, 1994.
Quick Quote, QuickQuote Insurance Quote System and Related Publications, Jul. 1995.
Unknown, Response Required Data Structure for Information Interchange in an Office Network.
Precision Marketing, Banking on the Changing Future, May 29, 1995.
Katherine Morrall, Forging Bonds with the Mature Market, Sep. 1995.
Elizabeth Daniele, Serendipity or Science, Mar. 1993.
Ruth Kastrud, The Agent's Creativity Advantage, Sep. 1991.
Hearst Communications Inc., Zone—Getting Control of Your Cashflow—A Financial Planning Primer, Mar. 13, 1985.
T.J. Hughes, The Customer Database: Cross Selling Retail Financial Services 1992.
Seattle Times, Economy Computers Cranking Out Personal Financial Plans—But Some Say the Plans are Just Boilerplate, Nov. 2, 1985.
Unknown, Tradewise—A New Electronic Concept in Insurance, May 1, 1994.

D.S. Fisher T.W. Tyler, Using Distributed OLTP Technology in a High Performance Storage System, Mar. 1995.

Charles C. Ashley, Rearranging the Distribution System Oct. 1, 1991.

Countrywide affiliated companies, Countrywide affiliated company systems, Nov. 14, 1996, Apr. 1, 1993.

Interview of Richard Crone, Electronic Marketing: It's the Content That Counts, Jul-96.

Joachim Angstenberger, Database Marketing, Response Analysis and Forecasting in Financial Engineering, May 22, 1997.

Amy Dunkin, Unlocking the Mysteries of Term Life, Jul. 1, 1996.

Joseph B. Treaster, Internet Sales Offer an Insurance Alternative, Sep. 6, 1996.

Business Wire, QuickQuote Adds First Chicago Nbd to Client Roster, Sep. 5, 1996.

Insweb Corporation, Insweb Corporation Online Quote System and Related Publications, 1997.

Amy Rice and Julie Hsu, EZ Reader: Embedded AI for Automatic Electronic Mail Interpretation and Routing, *Proceedings of the Thirteenth National Conference on Artificial Intelligence and the Eighth Innovative Applications of Artificial Intelligence Conference*, 1996.

"Defendants' Joint Invalidity Contentions," In re Phoenix Licensing, LLC Patent Litigation, *In the United States District Court for the District of Arizona*, 222 pages, Dec. 19, 2008.

Claim Chart re above "Defendants' Joint Invalidity Contentions," in re Phoenix Licensing, LLC Patent Litigation, *In the United States District Court for the District of Arizona*, 1,570 pages, Dec. 19, 2008.

Exhibit B re above "Defendants' Joint Invalidity Contentions," In re Phoenix Licensing, LLC Patent Litigation, *In the United States District Court for the District of Arizona*, 12 pages, Dec. 19, 2008.

* cited by examiner

SYSTEM, METHOD, AND COMPUTER PROGRAM PRODUCT FOR SELECTING AND PRESENTING FINANCIAL PRODUCTS AND SERVICES

CROSS-REFERENCE TO RELATED APPLICATIONS

This is a continuation-in-part of pending U.S. patent application Ser. No. 09/592,086, filed Jun. 12, 2000, which is a continuation of U.S. patent application Ser. No. 08/834,240 filed Apr. 15, 1997, now U.S. Pat. No. 6,076,072, and which is also a continuation-in-part of U.S. patent application Ser. No. 08/661,004, filed Jun. 10, 1996, now U.S. Pat. No. 5,987,434, all of which are herein incorporated by reference in their entireties.

BACKGROUND OF THE INVENTION

1. Field of the Invention

The present invention relates to apparatus and methods for marketing financial products such as individual insurance policies. More specifically, it relates to apparatus and methods for marketing such products in a fully automated or significantly automated manner to achieve high volumes of transactions and sales in a short period of time.

2. Description of the Related Art

Financial products such as life insurance products, health insurance products, and the like traditionally have been marketed largely through the use of agents. The product providers, such as the insurance companies actually providing the insurance, rely upon the agents to perform a host of essential tasks to sell their products. The agents, for example, typically identify prospective clients ("prospects") and communicate with these prospects to determine which of the various financial products are appropriate for that individual. A "prospective client" as used in this document refers to a person, company, or other entity to whom a financial product has never before been sold by the system user of marketer, and an existing client of that user or marketer which has purchased financial products in the past and for which a client record has been created in the client database as described more fully below. In a representative case, for example, the agent obtains a limited amount of basic or "lead" information about the prospective client from which to initiate the marketing contact. In the case of a mortgage insurance policy, for example, the agent may obtain the type of information included in a recorded deed instrument, including the potential client's name, address, age, and mortgage amount. From this lead information, the agent typically would prepare introductory materials, and contact the prospective client by telephone to solicit a meeting in the client's home or business. The agent then would meet with the client and attempt to propose financial products most suitable for the particular circumstances.

There have been several attempts in recent years to mass market term life insurance products. A typical format would be as follows. The marketer generally places ads directed to the general public which provide either an (800) telephone number or a return postcard. Through either a return call from the prospective client or the return postcard from the prospective client, lead information is obtained, including the name, age, and smoker versus nonsmoker status of the client, and the amount of term insurance desired. From this lead information, the marketer selects from the term life insurance products available to it, the product with the lowest premium available to that client. In some instances, the marketer may select several products offering low premiums and provide them to the client, for example, in table format, for selections by the client. The marketer then includes these product selections in a presentation 6 letter which is sent to the prospective client. The presentation letter typically will list as the addressee the client, and it will provide the lead information at the introduction of the letter.

Regardless of the marketing techniques, gaining the consideration of the prospective client may require global followup in the form of multiple letters or other contacts, perhaps staged over a period of time selected by the agent as appropriate for the circumstances. Over this time period, the circumstances and needs of the prospective client may have changed, perhaps in ways that are somewhat predictable based on the initial lead information. For example, shortly after purchase of a new home and recording of the mortgage, the new homeowner may have a cash flow shortage which limits the attractiveness of mortgage insurance. Perhaps one year later, however, after the family is settled in and the various expenses of new home ownership have been accommodated, the homeowner may have a better cash flow situation and be far more inclined to purchase this type of insurance. Therefore, a followup presentation letter a year or so after the initial home purchase would be very timely and beneficial.

For those prospective clients who have responded to the presentation materials, the agent might seek additional client information, for example, such as their marital status, whether they smoke, their general health, etc. This would enable the agent to further refine or revisit the financial products selected for consideration by that prospective client. It hopefully results in the final selection of the particular product best suited for that client.

Upon approval by the prospective client, the agent or marketer then prepares an application to the provider for the selected financial product. Depending upon the financial product involved, the agent may be required to follow up, for example, by ordering medial reports, medical exams, etc., for the provider or underwriter.

Marketing processes such as the ones described above have been substantially limited in that they require significant amounts of the agent's or an agent telemarketer's time and attention. Moreover, the market for these products in terms of potential clients numbers in the millions per year. Each client has particularized circumstances and needs, and these circumstances and needs typically vary over time. The variety of financial products, even for a given need, is substantial. Considering all of these factors, the volume of transactions that can be undertaken by a given agent or agent telemarketer is relatively limited.

Attempts have been made in the past to automate limited portions of the various marketing tasks. It is not uncommon, for example, for insurance marketing organizations to maintain a database of potential clients and related client and prospective client information. Most insurance marketing companies also maintain databases of insurance products and related pricing information.

There are some insurance marketing companies, for example, which use computer software to select a set of candidate financial products from a larger set of possible products based upon premium prices. Some of the mass marketing organizations referred to above are examples.

In systems used by several mass marketers selling term life insurance, usually in conjunction with a telemarketer on the telephone, for example, the agent or an assistant enters lead client information into a computer, whereupon the software selects and displays the four or five term insurance policies offering the desired level of coverage for the lowest premium cost. The client information, together with the selected financial product information, then can be used to prepare introductory materials such as a presentation letter to the potential client, as previously described. The product selection and presentation letter preparation are done automatically.

Such known automated systems, however, have been subject to a number of important limitations and drawbacks. For example, they have been limited largely if not entirely to one of two major types (term of permanent) of product, i.e., term life insurance. The ability of these software systems to select from among alternative financial products has been extremely primitive. In most instances, the ability of the system is limited to selections based solely or predominantly on the insurance premium. They also typically require the attention of and interaction with the agent or telemarketer to gather and input the lead client information, and to aid in the selection of the most advantageous products for presentation to the client.

Another important drawback of such known systems is the limited extent to which they personalize the presentation letter or other communications. The presentation letter resulting from such systems usually is a form letter which merely lists the client information at the top of the letter, lists the product or products selected, and provides a brief non-individualized description or explanation of the product. The extent to which the communications take into account the particular circumstances and needs of the individual prospective client including individualized explanations necessary to make an informed decision about the highlighted products, has been extremely limited.

These known systems also are limited in their ability to process large volumes of prospective client communications. This is attributable in large part to their requirement for human input and decision making as a necessary part of their operation, and because of the relatively unsophisticated nature of the known system.

All of these methods and systems have been limited in that they require a substantial amount of human involvement. This necessitates substantial cost for wages, salaries, benefits, etc., and it can increase the likelihood of errors.

OBJECTS OF THE INVENTION

Accordingly, an object of the present invention is to provide an apparatus and method for transacting financial product marketing and sales which is capable of being highly automated.

Another object of the invention is to provide an apparatus and method for transacting financial product marketing and sales which is capable of processing relatively large volumes of client communications efficiently.

Another object of the invention is to provide an apparatus and method for transacting financial product marketing and sales which are relatively cost effective compared to prior approaches. Another object of the invention is to provide an apparatus and method for transacting financial product marketing and sales which are more personalized and individualized to individual prospective clients relative to prior approaches.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, an apparatus and method for transacting financial product marketing and sales is provided. The apparatus and methods according to the invention provide a marked departure from known financial product marketing and sales systems, for example, in that they allow for the virtually complete automation of the tasks traditionally performed by agents and telemarketers in transacting such marketing and sales. Automatically, with little or no human intervention and with essentially no time delays, they can analyze and evaluate client information, incorporate additional information, determine and/or compare client needs with various available financial products to solve needs, select and/or recommend products most appropriate for the individual needs of each prospective client, and prepare personalized and individualized correspondence specifically tailored for each individual prospect to effectively communicate the information to the prospective client that he or she needs to make and informed buying decision.

The apparatus according to one aspect of the invention uses client information from a client to automatically select and present financial products appropriate for the client. The apparatus comprises means for inputting client information relevant to a need by the client for the financial products, for inputting information about the financial products, for inputting ancillary data which excludes the client information and the financial products information, and for inputting decision criteria pertaining to selection from among the financial products. The apparatus further includes means for storing the client information, the financial products information, the ancillary information, and the decision criteria. The apparatus still further includes means for using the client information, the financial products information, the ancillary information, and the decision criteria to select a subset of the financial products. It further includes means for preparing a client communication which identifies the subset of the financial products. The client communication preparing means incorporates a portion of the client information and a portion of the financial products information into the client communication.

The method according to one aspect of the invention also uses client information from a client to automatically select and present financial products appropriate for the client. The method comprises inputting client information relevant to a need by the client for the financial products, inputting information about the financial products, inputting ancillary data which excludes the client information and the financial products information, and inputting decision criteria pertaining to selection from among the financial products. The method also includes storing the client information, the financial products information, the ancillary information, and the decision criteria. This method further includes using the client information, the financial products information, the ancillary information, and the decision criteria to select a subset of the financial products. It further includes preparing a client communication which identifies the subset of the financial products. This client communication preparing step includes incorporating a portion of the client information and a portion of the financial products information into the client communication.

BRIEF DESCRIPTION OF THE DRAWINGS

The accompanying drawings, which are incorporated in and constitute a part of the specification, illustrate a presently preferred embodiment and a presently preferred method of the invention. These drawings, together with the general description given above and the detailed description of the preferred embodiment and method given below, serve to explain the principles of the invention.

DETAILED DESCRIPTION OF THE PREFERRED EMBODIMENT AND METHOD

Figure 1:
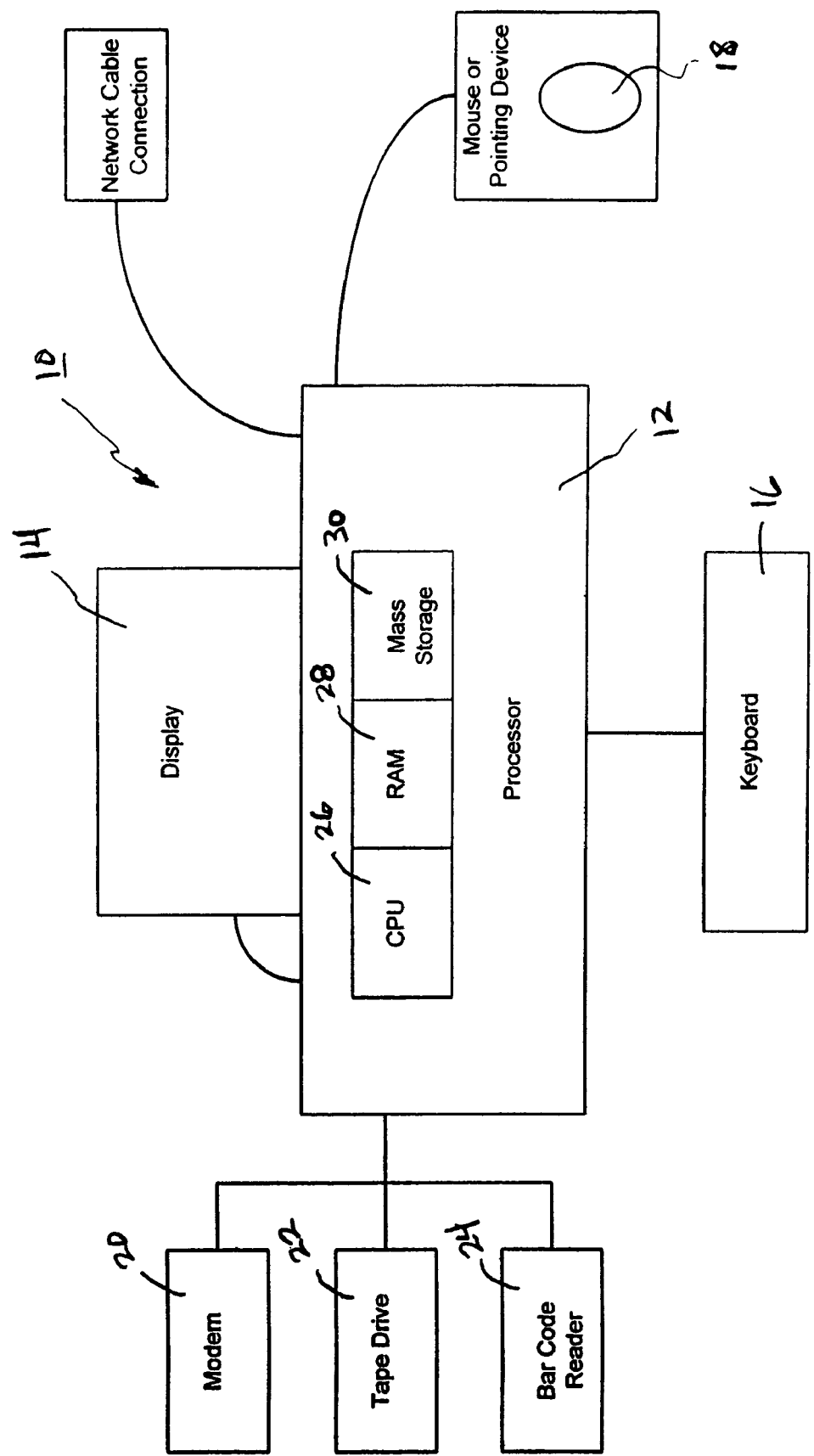
FIG. 1 is a hardware block diagram of the preferred embodiment of the invention.

Reference will now be made in detail to the presently preferred embodiment and method of the invention as illustrated in the accompanying drawings, in which like reference characters designate like or corresponding parts throughout the drawings.

The presently preferred embodiment of the invention comprises an apparatus and method for transacting the marketing and sales of financial products. Financial products as the term is used in this document refers to insurance products such as individual life insurance of all types, tax deferred annuities of all types, health insurance of all types, and the like. Financial products, however, also may include other forms of financial instruments.

For purposes of illustration and not by way of limitation, the financial products discussed in this document in connection with the preferred embodiment and preferred method comprise individual insurance products, such as individual life insurance and health insurance. Examples of life insurance would include individual term and permanent life insurance instruments such as whole life, universal life, level and decreasing term life insurance, and the like. It is to be understood, however, that the invention is not necessarily limited to these products.

A presently preferred embodiment of the apparatus according to the invention is illustrated in FIG. 1. This embodiment comprises a computer system using a networked client-server database system architecture with a number of computer nodes or computer workstations. A network server 10 is shown in FIG. 1. Computer workstation nodes would be very similarly configured. In addition to the server and workstation nodes, system nodes also may include output devices, such as laser printers (not shown). Each of the individual computer workstations or nodes within the system includes a processor 12, a display 14, a keyboard 16, a mouse 22, light pen, or similar pointing device 18, a modem 20, a tape drive 22, and a bar code reader 24.

The processor of each computer node (server or workstation) includes a central processing unit (CPU) 26, random access memory (RAM) 28, and at least one mass storage device 30. The design and configuration of CPU 26 is not limiting, and may include any of the CPU designs sold as standard components with high-end IBM-compatible personal computers or business machines. Such processors include Pentium™ processors from Intel Corp., Santa Clara, Calif., Power PC processors from IBM Corp., and their substantial equivalents, preferably with at least 16 megabytes of RAM and a hard drive with at least about 500 megabytes of storage capacity. The capability and speed of CPU 26 will depend upon the specific application to which the apparatus is to be put, the volume of data to be handled, etc. In the preferred embodiment of FIG. 1, the CPU of the principal server comprises a 100 MHz Pentium-based processor with 32 megabytes of RAM and a 2 gigabyte hard drive. The CPUs of the network workstations comprise 90 to 100 MHz Pentium-based processors with at least about 16 MHz of RAM and at least about 500 megabytes of hard disk storage capacity.

Display 14 should be compatible with the processor, and preferably should have a resolution of at least about 800×600 pixels. Other than these requirements, many commercially-available Super VGA monitors would suffice.

Keyboard 16 is a standard IBM PC-compatible keyboard which is compatible with the processors. Keyboard 16 comprises a means for the system user to selectively input information, decisional criteria, module instructions, and the like into the system where manual input is called for.

The mouse, light pen, track ball or similar pointing device 18 is used to navigate the graphical user interface of the system, which is designed to increase the ease of use of the system, as will be described more fully below. It also comprises means for inputting information into the system, particularly where graphical interface environments are used in implementation. These devices may be obtained from commercially-available sources as off-the-shelf components.

Modem 20 is used for communicating with computer systems remotely from processor. The design of modem 20 also is not limiting, and its specific design will depend upon the design of processor, the design and configuration of the computer or computers to be communicated with, and similar generally known factors in a given application. In the preferred embodiment of FIG. 1, modem 20 comprises a 28.8 baud modem which is compatible with processor, such as the Model Sportster 28.8, commercially available from U.S. Robotics Inc.

Tape drive 22 is optional, but may be used for inputting bulk files and lists, as described in greater detail below. The specific design and configuration of tape drive 22 also will depend to a large extent on the design and configuration of other system components, and on the particulars of the application. In the preferred embodiment of FIG. 1, tape drive 22 comprises a high-capacity digital tape device which may be obtained as an off-the-shelf component from commercial suppliers.

Bar code readers may be used to speed manual input of data and also to record responses and other correspondence from prospective clients; They should be industry-standard readers capable of reading the major bar code formats, such as Code-39 bar codes, and inputting the scanned information to processor. An optical scanner also may be provided as an optional input device, as described in greater detail below.

Figure 2:
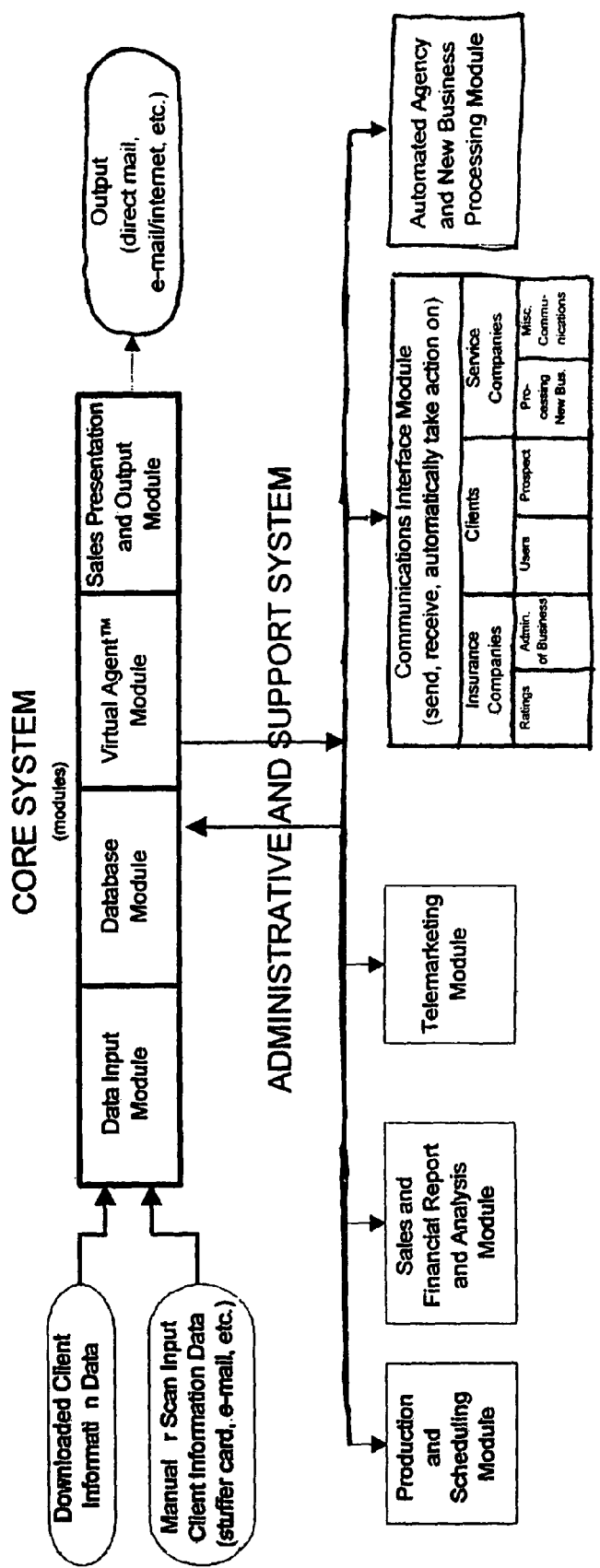
FIG. 2 is a flow chart diagram illustrating the preferred embodiment and method of the invention.

In accordance with the preferred embodiment and the preferred method of the invention, processor 10 has resident within its memory system computer software, a flow diagram of which is shown in FIG. 2. The software has a "core" system for transacting financial product marketing, and an "administrative and support" system for supporting the core system, facilitating the marketing program, providing administrative and management reports and functions, and preferring other tasks. The core system includes a plurality of modules, including a data input module, a database module, a Virtual Agent™ module, and a sales presentation and output module. The administrative and support system includes a production and scheduling module, a sales and financial report and analysis module, a telemarketing module, a communications interface module, and an automated agency and new business processing module. Each of these systems and modules will be described in greater detail below.

The Data Input Module

The data input module performs tasks related to inputting prospective client information into the system. The types of prospective client information to be inputted will vary, depending, for example, on the types of plans and products involved, the types of prospective client information available, etc. Typical examples for individual life insurance might include the prospective clients name, address including zip code, age, and whether he or she smokes. Where individual mortgage life insurance is involved, the available, prospective client information may include only name or names on the mortgage loan, address, mortgage date, and mortgage amount.

Product-related information also would be entered into the system. Examples of this type of data or information would include product-related descriptions, issue constraints, product prices, etc. Ancillary data also may be entered into the system using the input module. Such ancillary data would include virtually any type of data or information useful for the system in performing its intended function, but by definition excluding client information about specific clients and product-related information about products potentially presentable by the system. Examples of such ancillary data or information would include statistical information, geo-code data, and the like.

The means of inputting may vary depending on the format in which the information is available. With reference to FIG. 1, for example, information may be directly entered using keyboard 16. Diskette drives (not shown), for example, as would come a standard equipment with the types of processors noted above also my be used. In some instances, bulk lists of client records may be available by tape, in which case in which case tape drive 22 may be used. Some records are available on non-resident date bases. This is increasingly the case as online networks such as the Internet gain widespread use and acceptance. In such instances, prospective client information may be received via modem 20.

Figure 3:
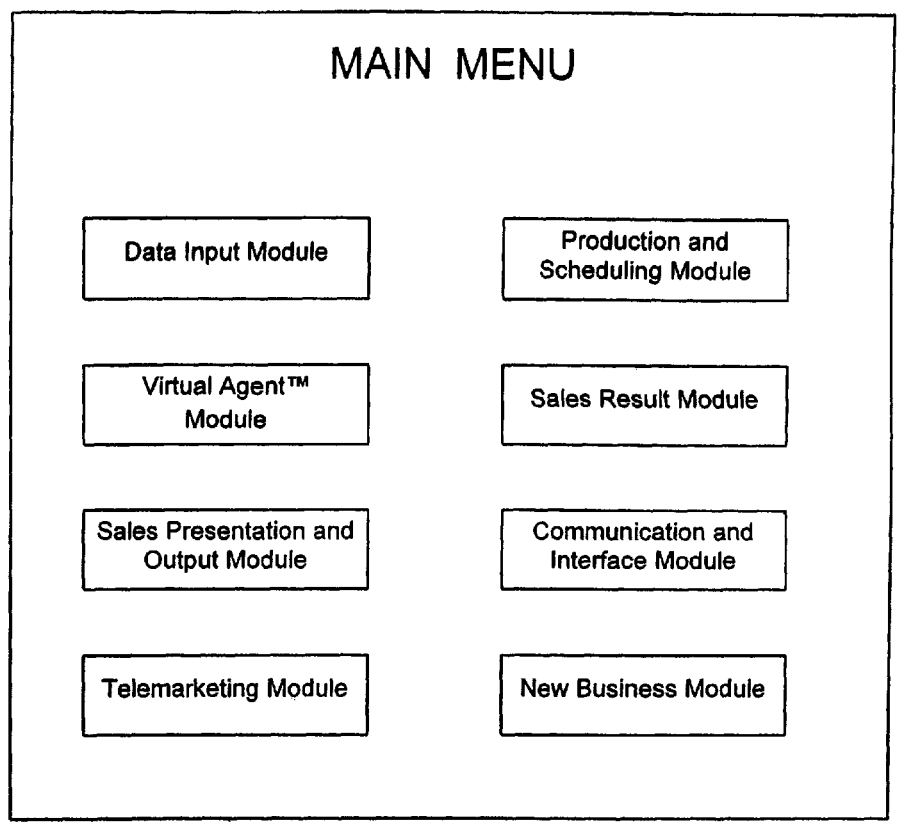
FIG. 3 provides an illustrative main menu for the system depicted in FIG. 2.

In accordance with the preferred embodiment and method, an example of a main menu for the system is shown in FIG. 3. This menu includes a plurality of buttons corresponding to the modules of the system as depicted in FIG. 2.

Figure 4:
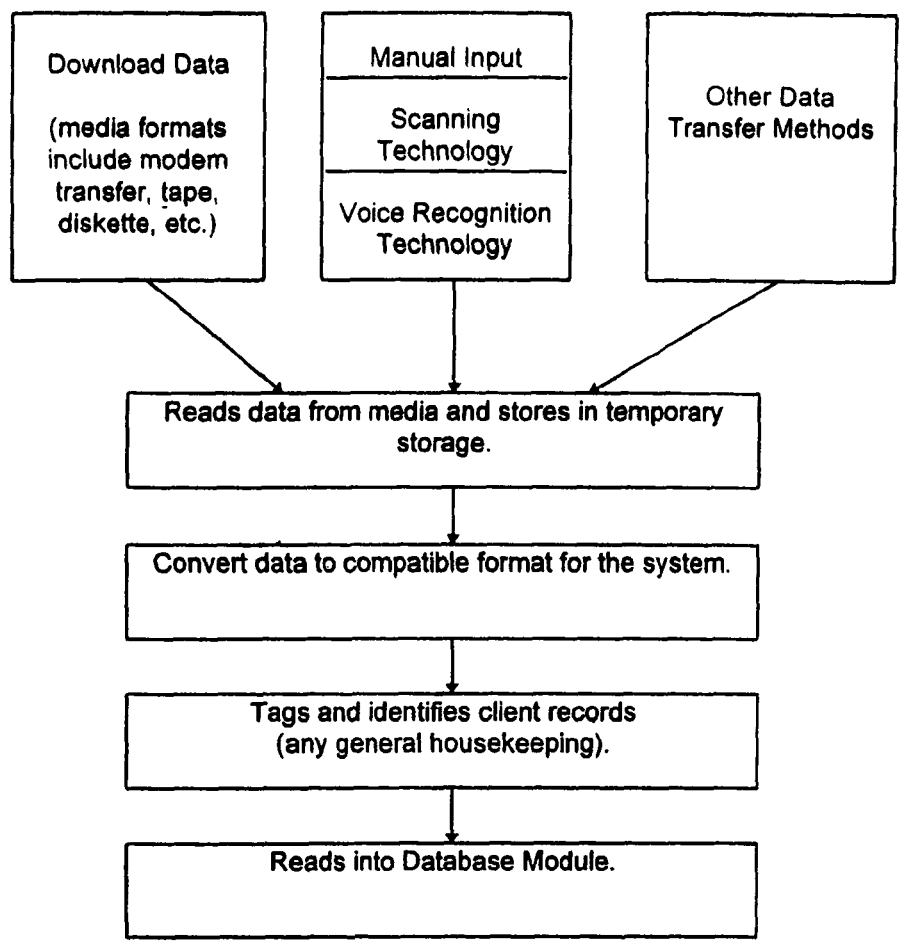
FIG. 4 is a flow chart diagram illustrating the data input module of the preferred embodiment and method of the invention.

An example of the organization and task flow of the data input module shown in FIG. 4. As noted above, data may be entered manually or automatically.

For example, information may be entered using scanning technologies. For example, bar codes may be used on advertisements, information cards and other documentation. Scanners such as those commercially available for use with processor 12 may be used to read the bar coded information. Similarly, an optical scanner may be used to scan an entire page or document, and standard image processing software may be used to read information from the scanned client information from the scanned input.

The invention is not, however, limited to these input modes, and others may be used. For example, as voice recognition technology develops, there very well may be the ability to input client information merely by voicing that information into a voice recognition device, which would translate the voice information into digital client data.

The task of automatically or semi-automatically performing the functions of an agent in marketing and selling financial products generally will require that the system receive or gather on its own essentially the same client information that would be made available to an agent. For a given potential client, the system is adapted to retrieve client information and, depending upon the circumstances, other information as well. Inherent advantages of using an automated environment to undertake these tasks is the tremendous speed with which computers can retrieve, process and store large volumes of information.

The data input module of this embodiment and method inputs data into the system from one or more of the input devices for the system, such as modem 20, tape drive 22, or barcode reader 24. The details of the data input module will depend to a certain extent upon the type of data to be input. For example, input data for a set of potential mortgage insurance clients might include the mortgagee's name, the address of the mortgaged property, and the amount of the mortgage. Input data for potential life insurance clients might include the name, address, age, and marital status of each potential client.

With further reference to FIG. 4, as data is imputed, the data input module stores it in a temporary storage area within processor 12. If necessary or appropriate, the data is converted to a format compatible with the system. For example, as is known in the database arts, it is sometimes necessary to import or export files to convert one database format to predefined database structure. In this embodiment, the data input module also may tag and identify client records as they are inputted, and perform general and routine "house keeping" tasks on the data. Once these tasks have been performed by the data input module, the properly-formatted client information is transferred to the database module. In the preferred embodiment, the database module comprises a relational database essentially equivalent to commercially-available database packages.

The Database Module

The database module stores client information for general use by the system, as explained more fully below. The database stores client information so that each client is represented by a record in the database, and the various items of information to a given client are contained within fields under the record for that client. Examples of the structure and contents of a client database for life insurance, for example, may include the following fields:

Name
Address (including zip code)
Age
Tobacco user v. non-tobacco user
Marital Status
General Health The contents of a representative client database record for marketing of individual mortgage life insurance may include the following:

| Borrower | Co-Borrower |
| --- | --- |
| Name | Name |
| Address | Address |
| (including zip code) | (including zip code) |
| Age | Age |
| Tobacco user v. non-tobacco user | Tobacco user v. non-tobacco user |
| Marital Status | Marital Status |
| General Health | General Health |

The database module also includes information other than client information. For example, this module typically would include a listing of the financial products. This information typically would include not only the identification of the product, but information about pricing and "issue constraints" for the product. Issue constraints as used here refers to limitations on the availability of the product, e.g., age range constraints, amount constraints, and so forth. The product-related database also may include descriptions and explanations of the products. This will be explained in greater detail in connection with the sales presentation and output module.

The Virtual Agent™ Module

The Virtual Agent™ module uses client information and its own decision logic as described more fully below to select the plan or plans and the financial product or products which best meet a specified set of decision criteria. The Virtual Agent™ module embodiment and method also is designed to perform many of the analytical and decision making tasks that would normally be performed by an agent. This would include, for example, but is not limited to analyzing the particular circumstances, and demographics of each client, analyzing a variety of plans and financial products which are calculated to meet the needs of the client, and applying decision making criteria to select from among those plans and products the ones most suitable for the client based on the decision making criteria. Within these general guidelines, however, the Virtual Agent™ module provides tremendous flexibility. It may be adapted, for example, to handle a wide variety of classes of financial products, such as term life insurance, permanent life insurance, combinations of term and permanent life insurance, health insurances, disability insurances, long term care insurances, and the like. The Virtual Agent™ module can accommodate any type of client information that can be incorporated into the client database. In addition, the Virtual Agent™ module has great flexibility in the specific analytical and decision making methods and procedures used. Specific yet nearly illustrative examples are provided below.

Figure 5:
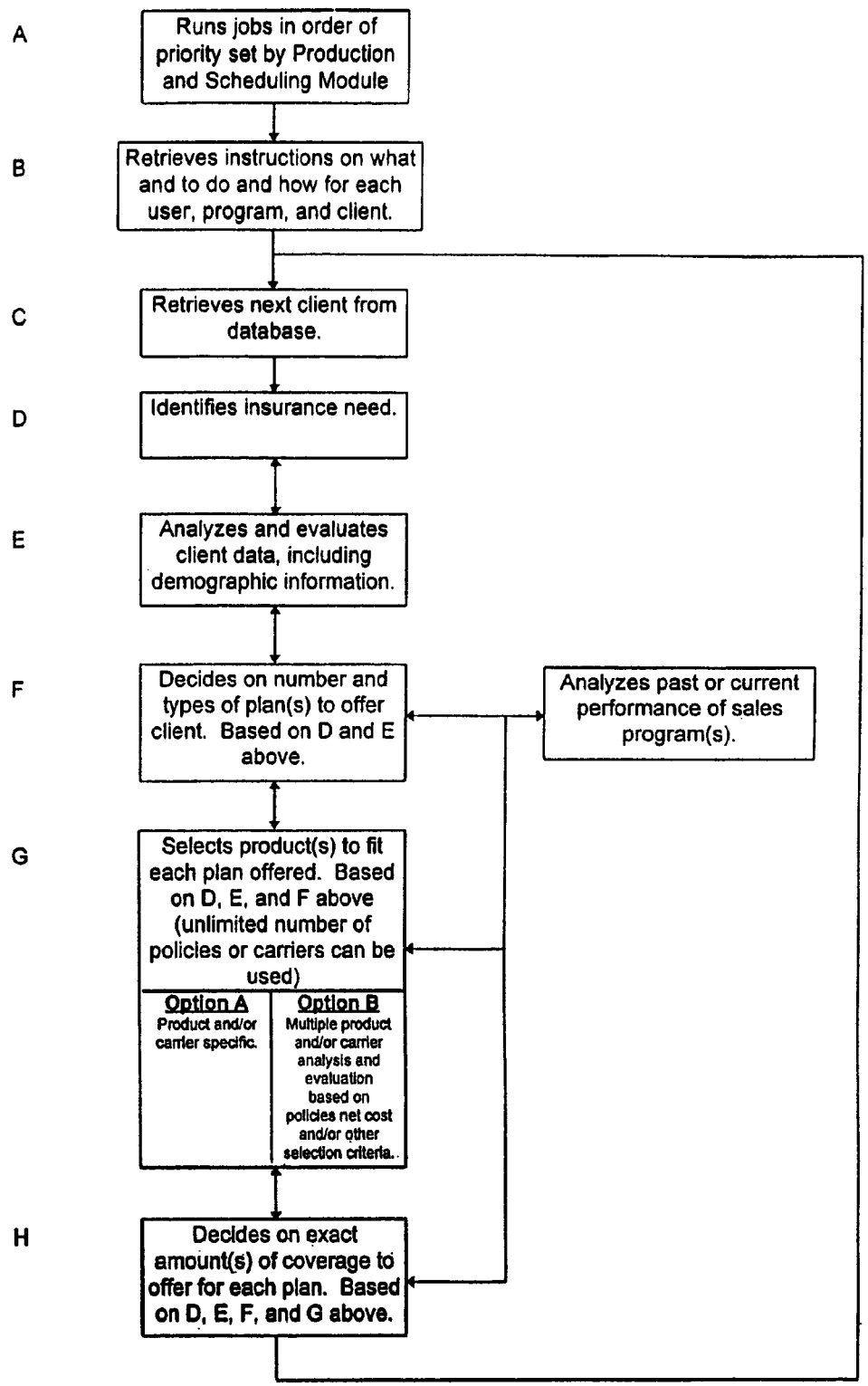
FIG. 5 is a flow chart diagram illustrating the Virtual Agent™ module of the preferred embodiment and method of the invention.

A flow chart depicting the general organization and logic flow of the Virtual Agent™ module for the preferred embodiment and method is presented in FIG. 5. Note, however, that steps D through I of FIG. 5 need not necessarily be carried out in the order shown. The Virtual Agent™ module flow process retrieves or otherwise receives client information from the database module and from other areas of the system. The Virtual Agent™ module is described herein as processing data files sequentially, one record at a time. This is not necessarily limiting. For example, the Virtual Agent™ module may be configured so that it processes more than one record at a time through such generally known approaches as multi-tasking or parallel processing.

The type of information retrieved by the Virtual Agent™ module will depend upon the type of analysis under consideration, and for which the system has been adapted. Illustrative examples of such input data is described above with reference to the data input module.

In Step B of Virtual Agent™ module processing according to this embodiment and method, the Virtual Agent™ module retrieves the set of analysis instructions and decision making criteria to be used in processing the retrieved set of client records. Examples of these analytical instructions and decision making criteria will be presented below.

In Step C of Virtual Agent™ module processing according to this embodiment and method, the Virtual Agent™ module retrieves or otherwise receives a set of client records from the client database. Depending on the particular application, the Virtual Agent™ module may undertake some pre-sorting or other manipulation of the client information prior to the principal analysis of it. For example, there may be categories or items of information within a given a client record that are not utilized in the analysis and decision making procedures to be undertaken by the Virtual Agent™ module in that application. Therefore, it may be appropriate to modify the retrieved client records to eliminate such categories or items before further processing in undertaken in the Virtual Agent™ module.

In Step D of Virtual Agent™ module processing according to this embodiment and method, the module identifies, evaluates and analyzes the needs of the client among other reasons for plan(s) and product(s) selection of a given type. For example, in the context of individual mortgage life insurance, the client would want to pay off the loan in the event of the mortgagee's death.

In Step E of Virtual Agent™ module, the module analyzes the customer information for that record, including demographic information.

In Step F of Virtual Agent™ module processing, the module uses the analyzed client information and applies it against the decision making criteria.

To illustrate the types of decision making procedures and criteria which may be embodied in the Virtual Agent™ module, we will continue to use the example of individual mortgage life insurance. Pursuant to the example, assume that each client record includes the address of the property subject to the mortgage, the amount of the mortgage, the monthly mortgage payments and the following information for each borrower and co-borrower: Name, age, and gender. As part of the analytical and decision making criteria information retrieved by the Virtual Agent™ module, a set of scenarios are provided for characterizing the client and the surrounding circumstances. Illustrative examples of the scenarios would include the following:

| | |
|---|---|
| Scenario 1: | Single individual borrower. |
| Scenario 2: | Two borrowers of different gender, which may include a husband and wife, business partners, etc. |
| Scenario 3: | Two borrowers of the same gender, which may include a parent and child, siblings, business partners, gay partners, etc. |

Figure 6:
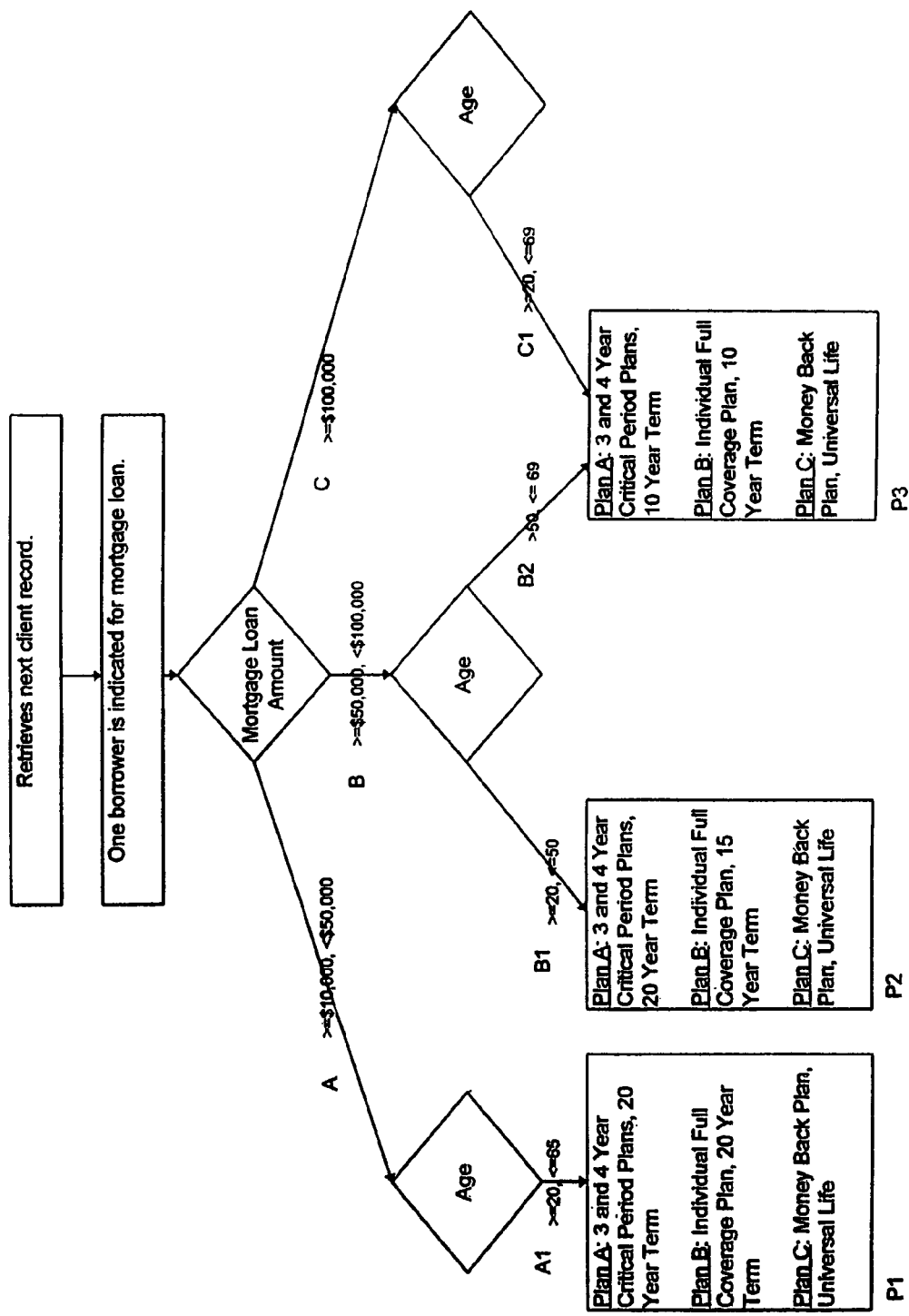
FIG. 6. is a flow chart diagram illustrating a specific example of the organization and flow of the Virtual Agent™ module specifically pertaining to a individual mortgage life insurance program.
Figure 7:
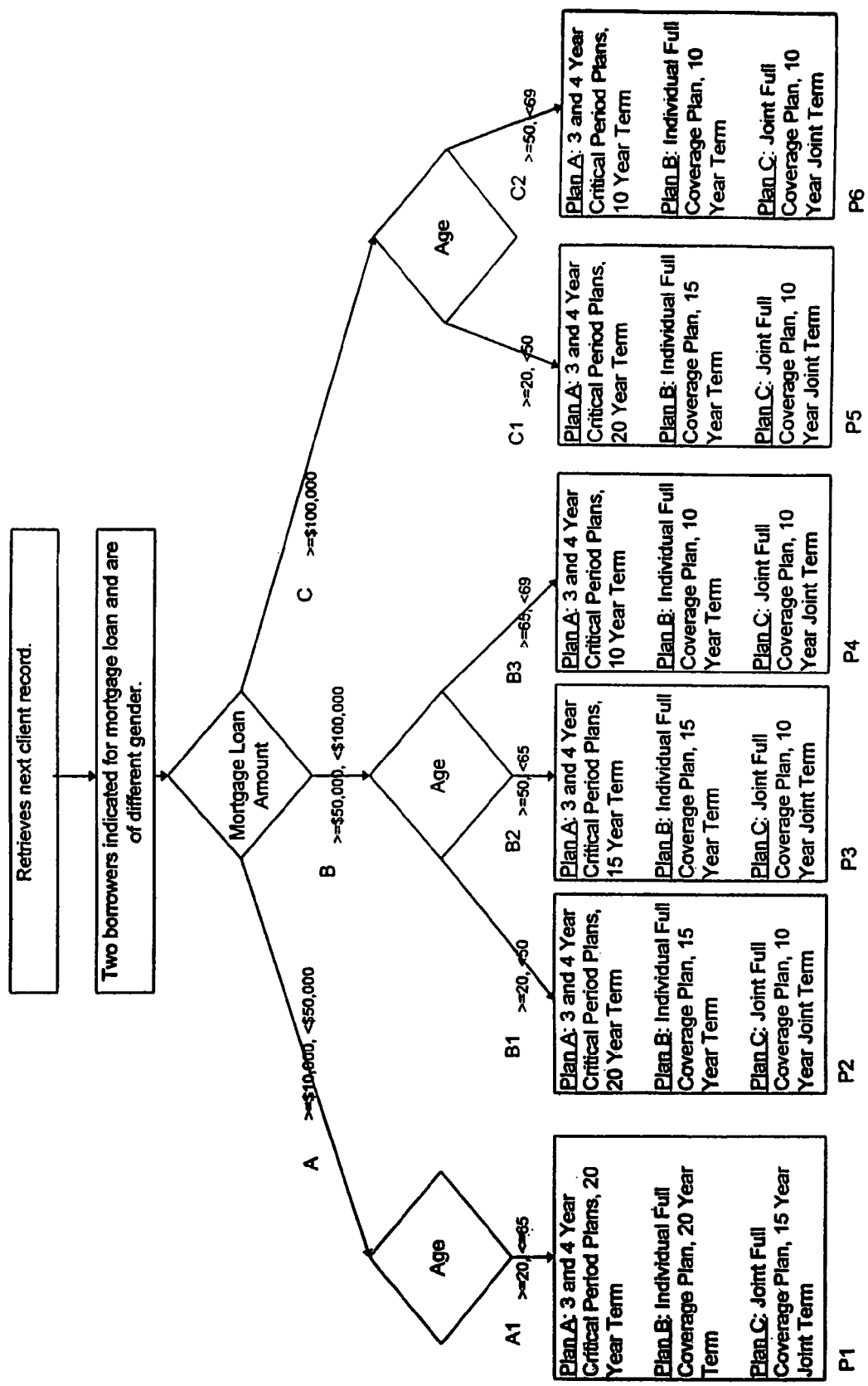
FIG. 7. is a flow chart diagram illustrating another specific example of the organization and flow of the Virtual Agent™ module specifically pertaining to a individual mortgage life insurance program.
Figure 8:
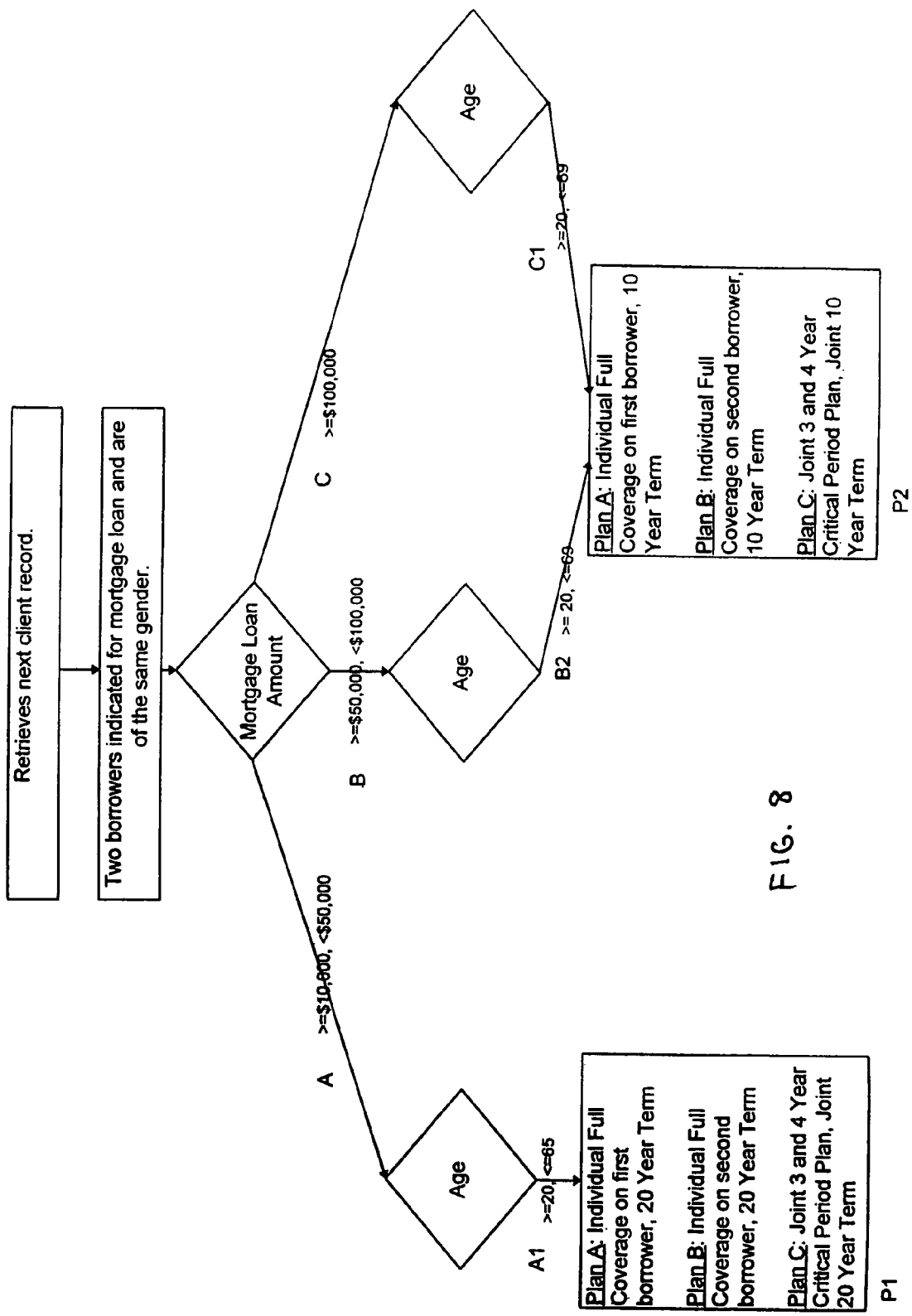
FIG. 8. is a flow chart diagram illustrating a specific example of the organization and flow of the Virtual Agent™ module specifically pertaining to a individual mortgage life insurance program.

As part of the retrieved decision making criteria, the Virtual Agent™ module would retrieve the information depicted graphically in FIGS. 6-8. If the client record under consideration reflected a single borrower, the Virtual Agent™ module would employ the decision making criteria reflected in FIG. 6. According to those criteria, the Virtual Agent™ module would determine which of three mutually exclusive categories the mortgage falls based on the loan amount. In this example, loan amounts of at least $10,000 but less than $50,000 would fall into category A. Loan amounts of at least fifty thousand dollars but less than one hundred thousand dollars would fall into category B, whereas loan amounts of at least one hundred thousand dollars would fall into category C. At a second level of decision making, the age of the borrower would be considered. For borrowers in category A between the ages of twenty (20) and sixty-five (65), the Virtual Agent™ module would select product package number 1 (P1), which includes three alternative plans, i.e., plan A, plan B, or plan C, as described in the box for package P1 in FIG. 6. Note that for any age or mortgage loan amounts outside the ranges indicated in FIG. 6. no proposal would be made because of issue constraints.

To the extent the client record falls into category B based on loan amount, the agent borrower similarly would be used to further categorize the record. In this illustrative example, category is segregated into two age categories, i.e., B1 and B2. Category B1 includes borrower of at least twenty (20) but less and fifty (50). Category B2 includes ages greater than fifty (50) but less than sixty-five (69). Those records qualifying under category B1 would result in the proposal of a package P2. This package P2 would include three optional proposals, as described in the box for package P2 in FIG. 6.

For category B2, a package P3 would be proposed. Package P3 similarly includes three optional plans, as described in the box for package_3 in FIG. 6.

For those records falling within category C, i.e., involving loan amounts of at least 100,000, package P3 would be proposed.

Also under Step F of FIG. 5, the Virtual Agent™ module would analyze each client record to recognize scenario #2, i.e., two borrowers of different gender. The decision making criteria and processing undertaken for records qualifying under scenario #2 is depicted in FIG. 7. Processing under this scenario would be very similar to that described above with regard to FIG. 6. At the initial level, each record would be categorized based on loan amount. Segregation at a second level would occur based on age of the first or principal borrowers Similarly to FIG. 6, those clients qualifying under scenario #2 and falling within category A1 would be proposed a package P1 which includes three optional plans, i.e., A, B and C. A package P2 would be proposed to those clients qualifying under category B1 in FIG. 7. For those clients qualifying under category B2, a package P3 would be proposed. For those clients qualifying under category B3 of FIG. 7, a package P4 would be proposed. For clients qualifying under category C1, package P5 would be proposed. For those clients qualifying under category C2, a package P6 would be proposed.

Where the client record indicates there are two borrowers of the same gender, scenario #3 would be implicated. The decision making criteria and processing for this illustrative example is shown in FIG. 8, which follows the same logic and processing of FIGS. 6 and 7. In Step F of the Virtual Agent™ module flow depicted in FIG. 5, the module decides on the number and types of plans to be proposed to the client. This decision is based upon the insurance needs of the clients as identified in Step D above, on the client information in the client record, and possibly on other information such as demographic information, geo-coding information, etc. This step involves making an informed intelligent decision regarding the possible solution or solutions to the product needs of the customer. Factors which may be considered by the module in this selection process may include the client demographic information (e.g. age, gender, tobacco usage, and occupation) mortgage information, financial information such as income, marital information, existing policy information, family-related information, and other factors selected by the system user and incorporated into the Virtual Agent™ module decision making criteria.

In Step G of the Virtual Agent™ module flow of FIG. 5, the module selects the product or products which satisfy the decision making criteria being employed in the module. Under this Step G, the Virtual Agent™ module draws from the available product pool the most appropriate product to fit each plan selected as a candidate in Step D. Preferably the Virtual Agent™ module has the ability to select from a large number of products and product providers. In performing this Step E the Virtual Agent™ module may take into consideration factors such as: the premium for the product, the compensation paid to the system user or other provider including primary and secondary compensation, legal issues, underwriting requirements, demographic information pertaining to the client, and the net cost of premiums over a specified period of time. As to legal issues, all local, state, and federal laws regarding insurance sales, for example, and additional constraints imposed by product providers may be considered.

In this illustrative example, two methodologies may be employed for selecting the product, i.e., a product and/or product provider-specific methodology and a "best policy" analysis methodology. Both of these methodologies taken to account the information from Steps D, E, and F. The first methodology considers each of the various factors which may be used to evaluate the attractiveness of that product for the particular client. Such factors considered by the Virtual Agent™ module may include the premiums, issue constraints, compensation paid to the system user, product provider, etc., and underwriting requirement.

The "best policy" methodology evaluates and analyzes a potentially large number of product providers and products which best meet a specified set of criteria, for example, by picking the product having the lowest premium for the client.

In Step I of Virtual Agent™ module processing according to this embodiment and method, the module analyzes the past or current performance on a real-time basis of various sale programs. It identifies on a real-time basis who is buying on any geographic or any demographic basis. This step involves determining what the individual client is most likely to buy, making the end users aware of that fact, recommending changes, and if given permission, or appropriately coded, automatically implementing the changes, which may occur even during the running of the module.

To better illustrate the organization, operation and flow of the Virtual Agent™ module, another example, i.e., one involving the logic associated with the marketing of life insurance, will now be explained with reference to FIG. 9. Step C, D, E, . . . of FIG. 9 correspond to Steps C, D, E, . . . respectively, of FIG. 5. In Step C, the Virtual Agent™ module retrieves a client record for analysis.

In Step D, the module identifies the insurance need for the client, e.g., to replace lost income.

In Step E, the module analyzes and evaluates client information for this client, including all pertinent client demographics available to the system. The system also may retrieve and use additional demographic data, for example from a geo-coding module.

The database module of this preferred embodiment includes a geo-coding module which includes geo-coding data. This geo-coding data can be organized by zip code and includes statistical information regarding location, average income, average education, average property values and the like within that zip code area. It can obtain in real-time any field of demographic information for use contained within the United States census.

Figure 9:
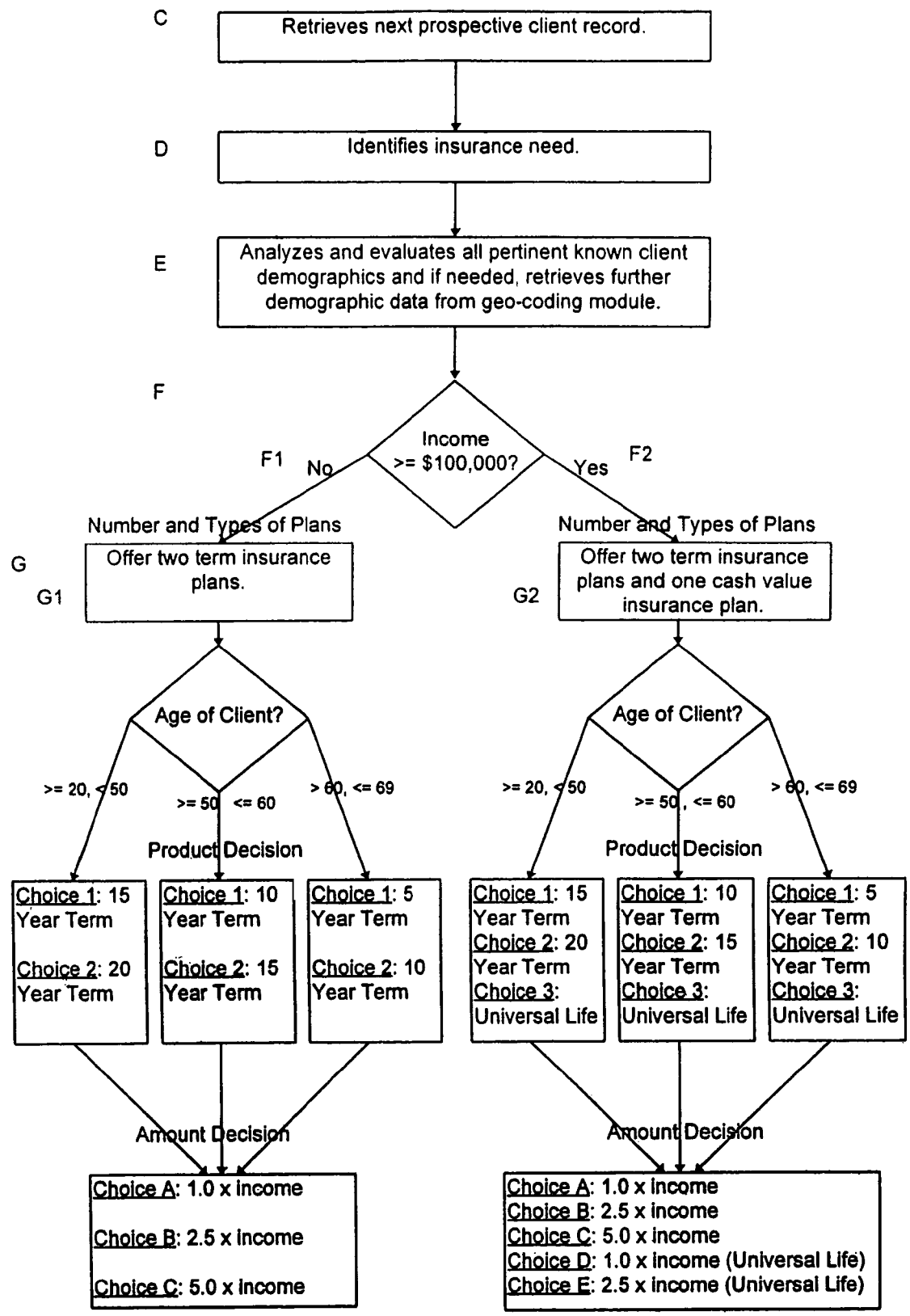
FIG. 9. is a flow chart diagram illustrating a specific example of the organization and flow of the Virtual Agent™ module specifically pertaining to a basic individual life insurance program.

In this illustrative example shown in FIG. 9, Step F involves segregating client records by annual income. For client records reflecting an annual income of less than one hundred thousand dollars, processing continues along a path F1. For client records reflecting an annual income of at least one hundred thousand dollars, processing proceeds along a path F2.

In Step G of FIG. 9, clients falling under category F1 are offered two optional term insurance plans, depending on the age of the perspective client. For those clients having an income of less than one hundred thousand (path F1), two term insurance plans would be proposed, but specifically which two would depend upon the age of the client. For clients at least twenty (20) years old but younger than fifty (50) years, their choices would include a 15 year term policy and a 20 year term policy. For clients aged at least fifty (50) but less than sixty, the choices would include a 10 year term policy and a 15 year term policy. For clients older than sixty (60) but not over sixty-nine (69), the two choices would include a 5 year term policy and a 10 year term policy. In each of these instances, three separate coverage amounts for each of the two policies proposed would be presented.

In this illustrative example, the system user may select between an Option A and a Option B. Under Option A, only specified products and/or specific product providers may be considered. Under Option B, a variety of products and product providers may be considered in selecting the appropriate plans and products for selection.

In Step H of the Virtual Agent™ module flow of FIG. 5, the module selects a specific amount or amounts of coverage to propose under each plan. This decision is based on the information as compile in Step D, E, F and G as described above.

These three coverage amounts are determined by multiplying the annual income by a multiplier and rounding (e.g., to the nearest $5,000 or $10,000). The multiplier for path F1 would be 1.0, 2.5 and 5.0 for plan A, B and C, respectively.

For those clients have annual incomes in excess of at least one hundred thousand dollars (path F2), the Virtual Agent™ module optionally proposes two term insurance plans and one cash value insurance plan. The specific plan again depend on the age of the client among other things. For clients at least twenty (20) but less than fifty (50) years old, the choices include a twenty year term policy, a 15 year term policy, and a universal life policy. For clients at least fifty (50) but no more than sixty (60), the choices include a 10 year term policy, a fifteen year term policy, and a universal life policy. For clients older than sixty (60) but less than sixty-nine (69), the choices proposed are a 5 year term policy, a 10 year term policy, and a universal life policy. In this example the Virtual Agent™ module also selects an amount of coverage based on income specifically, five alternative levels of coverage are proposed corresponding to annual income multipliers of 1.0, 2.5 and 5.0 respectively.

Sales Presentation and Output Module

The sales presentation and output module ("output module") uses the information obtained from the Virtual Agent™ module and optionally from other sources to generate, design, individualize and particularize all of the client communications. Presentation letters, followup letters, and reminders would be examples of such client communications. The output module automatically prepares and outputs a client communication, for example, in a form of a presentation letter, which provides information sufficient to enable the client to make informed, intelligent decision regarding the purchase of the plans or products selected by the Virtual Agent™ module. The Virtual Agent™ module creates these client communications in a manner using a format which personalizes and individualizes the information presented to the client.

This output module does not merely insert client information in the header of the client communication, nor does it merely import product information from the generic product information directly from the product-related database into the communication. The output module instead selectively uses substantial portions of client information, product information, and in many instances other information as well to generate a particularized communication tailored to the particular client for whom the communication is to be sent.

Client communications generation involves organizing, formatting and outputting client communications using information received generally from the Virtual Agent™ module. As explained, the Virtual Agent™ module uses client information, information about available financial products, and perhaps other available information to recommend products, plans, and the like specifically tailored to each client. The output module allows the system user to define a particularized communication format for classes of customers, such as for potential individual mortgage insurance clients. It then generates highly individualized communications specifically tailored to present that client with individualized plan and product presentations, reminders, followup, etc.

The output module is adapted to present its output in a variety of forms. For example, the output can be displayed on display 14 for visual inspection by the system user, or client, etc. The output also may be in the form of a printed letter or document using a printer such as a laser printer. It may be in the form of an automated document or data file or both, and it also may be in a form suitable for transmission, for example, over modem 20 or to a network, with or without simultaneous video conferencing.

The particular format of client communication outputs will depend upon the specific circumstances, such as client demographics, plans and products offered, and marketing objectives of the particular application. An Example of a presentation letter prepared using the preferred system and method and employing the individual mortgage life insurance program outlined using a procedure essentially as described above with respect to FIGS. 6-8 is attached as Appendix 1. An example of a presentation letter prepared using the preferred system and method and employing the individual life insurance program outlined using the procedure essentially as discussed above with respect to FIG. 9 is attached as Appendix 2.

Figure 10:
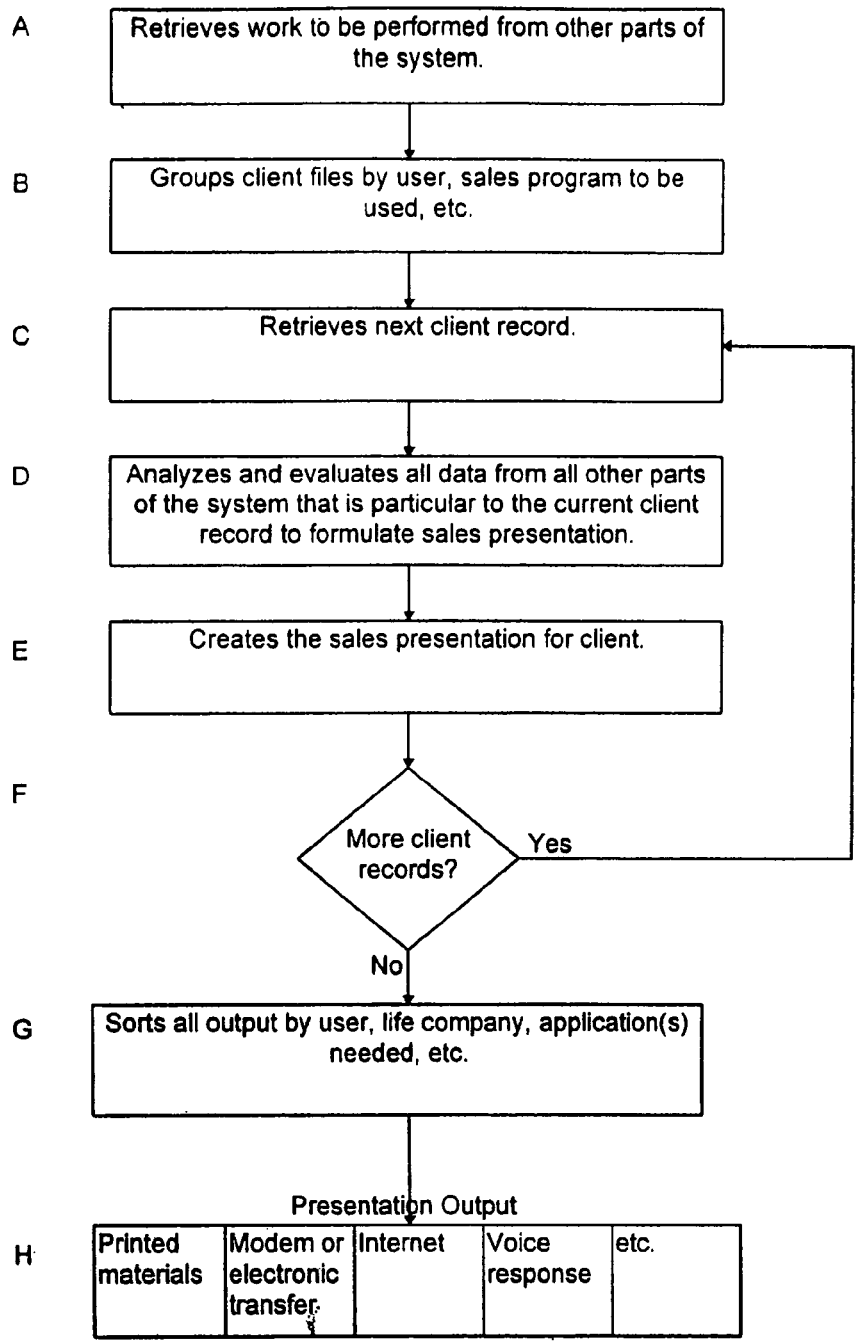
FIG. 10. a flow chart diagram illustrating the organization and flow of the sales presentation and output module of the preferred embodiment and method as depicted in FIG. 2.

FIG. 10 presents an illustrative flow chart diagram of the logic flow of the output module for the preferred embodiment and the preferred method. In Step A of FIG. 10, the output module retrieves work to be performed from other parts of the system. For example, after a set of records has been processed with the Virtual Agent™ module as described above, the output module would retrieve those files and store them in temporary memory locations so that a presentation letter, for example, can be prepared for each client record.

As part of Step A, the output module retrieves instructions which would be used in preparing the presentation letter or other communications output. The specific nature and content of these instructions will depend upon the specific type of presentation to be made and the specific format for the presentation. The specific examples to be presented below also provide a description and explanation of the types of the instructions used by the output module in preparing communications.

In Step B of FIG. 10, client files are grouped by user, or by the sales program to be used, or by other criteria specified by the system user. Grouping criteria preferably would be selected by the system user during a setup phase, and would remain unchanged indefinitely until a different set of grouping criteria is desired.

The processing of a set of client records to generate and output a corresponding set of presentation letters or other communications primarily takes place between Step C and F of FIG. 10. More specifically in Step C the output module receives a client record for processing. In Step D, the output module analyzes and evaluates the client information from the client record, the corresponding output from the Virtual Agent™ module for that client record, and other data or information needed to construct the communication. Other forms of data or information which might be retrieved at this point could include geo-coding data, demographic data, and the like.

In Step E, the output module uses the instructions for preparation of the communication, together with the data and information from Step D, to prepare the presentation or other communication. The specific manner in which the instructions and the information are used to construct the presentation will vary depending upon the application, the specification of the system user and other factors. To better understand and appreciate this aspect of the invention, however, we will refer to the presentation letter attached hereto as Appendix 1, which is a sample presentation letter presenting individual mortgage life insurance.

The sample presentation format used for this letter includes eight sections. Each section may or may not use information variables and insertion logic to construct the text or presentation of the section, and decisional logic may or may not be employed to determine what if any states the variable is to assume. In other words, the instructions and/or decision logic may be employed in various places throughout a section and throughout the entire communication to adapt the communication to the particular circumstances of the client. The following discussion will provide more concrete examples of these features.

The output module may include any one or any combination of at least four types of logic or variables, including (1) customer information logic, (2) words/paragraphs/sentence logic, (3) product/plan/amount of coverage/payment mode/underwriting logic, and (4) pricing logic. Logic or variable, as referred to herein, may involve the placement of a particular word, number, phase, or item of information in a particular place within the communication. Insertion of such items within a blank space in a sentence would be an example. Customer information logic refers to the place of the selective placement of client information in a particular location, blank space, or gap in a communication. Words/Paragraphs/Sentence Logic ("Word Logic") refers to the insertion of Words, Paragraphs, Sentence etc. other than client information, product type and related information and pricing information, which is selectively placed in a specific location, blank space or gap in the communication. Products/Plans/Amount of Coverage/Payment Mode/Underwriting Logic ("Product Logic") refers to information pertaining to any of these topics, which is to be placed in particular location, blank space or gap in the communication. Pricing Logic refers to pricing information that refers to the product, which is to be positioned in a particular location, blank space or gap in the document.

The purpose and function of each of the illustrative sections as created by the output module will now be outlined and discussed.

Section 1 describes the "need" for the proposed product and why the proposal or offer is being made to the client. In the individual mortgage life insurance application, the need is straightforward, i.e., to provide funds to pay the mortgage or liquidate it upon the death of the mortgagee so the family may retain ownership of the home without the burden of a mortgage. In the individual life insurance application, the need may be less apparent because there are so many individual uses of the product, a prime example of which is replacement of lost income.

In terms of variables, in this section, for example, the client name, address, the loan number and the loan amount constitute customer information logic gleamed from the client record. The entry at the top of the letter at "Co-Mortgager" as well as the name of the company of the third paragraph of the letter constitute word logic. The mortgage loan amount in the fourth paragraph of the letter again constitutes customer information logic.

Section 2 of the sample form presentation output presents proposed solutions to the need. This usually involves identifying and presenting alternative plan(s) or financial product(s) to meet the need, and factors such as the provider, coverage and price particular to each plan and product. Referring again to Appendix 1, most of section 2 comprises product logic and pricing logic. The boxed portion in which the client may select the desired plan also includes product logic, for example, in that not all product proposals will include the same plans as has been demonstrated in the examples shown above. Much of the information presented in the footnote supplementing the product presentation involves word logic, but customer logic (e.g., personal information about the client), product logic, and pricing logic also appear in this footnote material. The footnotes both front and back are highly individualized throughout.

In the case of individual life insurance, the proposed plans may include various plans which include term insurance products, and permanent insurance plans such as whole life, universal life, and the like.

Section 3 of the sample presentation format of Appendix 1 explains the various products selected by the Virtual Agent™ module for presentation to the client in this presentation. This section may include word logic and product logic, for example, in that is may provide alternative descriptions, explanations, even different tone of writing depending on such things as the age of the client.

Section 4 of the sample presentation format of Appendix 1 explains each plan utilized and selected by the Virtual Agent™ module. This section typically would include word logic and product logic in that the description would change for the various products and classes of the various plans and products. The description of plans will vary with the plan selected. In addition, for a given plan the explanation may change to more particularly addressed a given client or class of clients. For example, the explanation provided to a client in the twenty (20) to forty (40) year old category may differ from the explanation from for the same product provided to a client in the sixty-five (65) to sixty-nine (69) year old range. Similarly, the explanation for a single male may differ for a given product from the explanation provided for the same products to a married couple.

Incidentally the location of the various sections as described herein would not necessarily appear sequentially, e.g., section 1, 2, 3, . . . . The order may be changed or mixed, and information from one section may be intermingled or interposed with information from another section or sections. Sections and what is contained therein also may be subject to change frequently.

Section 5 of the sample presentation format explains to the client if there are requirements to qualify for a particular plan presented, if any. These requirements will be listed in this section 5 (if the plan requires such based on among other things, amount of insurance, age, etc.) if it is necessary to qualify with more than just the standard application presented to the client. Much of the logic here centers around Plan/Product/Amount of Coverage/Underwriting Logic, etc., and word and client information logic.

Section 6 of the sample presentation format explains in clear, concise and individualized terms how to obtain the coverage. This section typically will include customer logic in personalizing the presentation, e.g., by inserting the clients name in various places in the text, and product logic in explaining the requirements specific to a particular product(s).

Section 7 of the sample presentation format presents, in question and answer format, for example, important information and commonly asked questions regarding the plans and products shown in the presentation. This section typically would include word logic, e.g., to refer to the system user or product marketer. It also may include customer information logic, e.g., to refer to specific circumstances which the customer may encounter.

Section 8 of the sample presentation format is variable in nature, and may be customized for a given application, product set, system user, etc. It may, for example, provide information on how to obtain additional information, help with application forms, additional price quotes, etc. Given its customized format it may include any of the logic forms as variables.

Through designation by the system user in interaction with the system, the output module creates the format to be used, the specific information to be included within the format, and the specific locations in the output format where the specific items of information will be used. It also formats all sections to be easy to read and highly organized, no matter what amount of information is contained in the output.

In accordance with the preferred method, all sales presentation output sent to the client is accompanied by an application for the financial product, together with an envelope or other means to facilitate return. For example, presentation letters would be accompanied by a application for the products presented therein with a return envelope. This also could include electronic communication forms, such as by return e-mail, etc. This effectively results in a one-step sales process for any or all sales programs and products marketed by the system.

The Administrative and Support System

Turning now to the administrative and support system as illustrated in FIG. 2, the various modules of this system are intended to provide support functions for the Core System modules. In addition, they include management and administrative support modules to aid management in the system, including operation of the core-system, scheduling of follow-ups, future communications, etc., with little or no need for human involvement.

The Production and Scheduling Module

The production and scheduling module automates scheduling of marketing sales, preparing budgets, and the like. A flow diagram outlining the logical organization and flow of the production and scheduling module as shown in FIG. 11.

Figure 11:
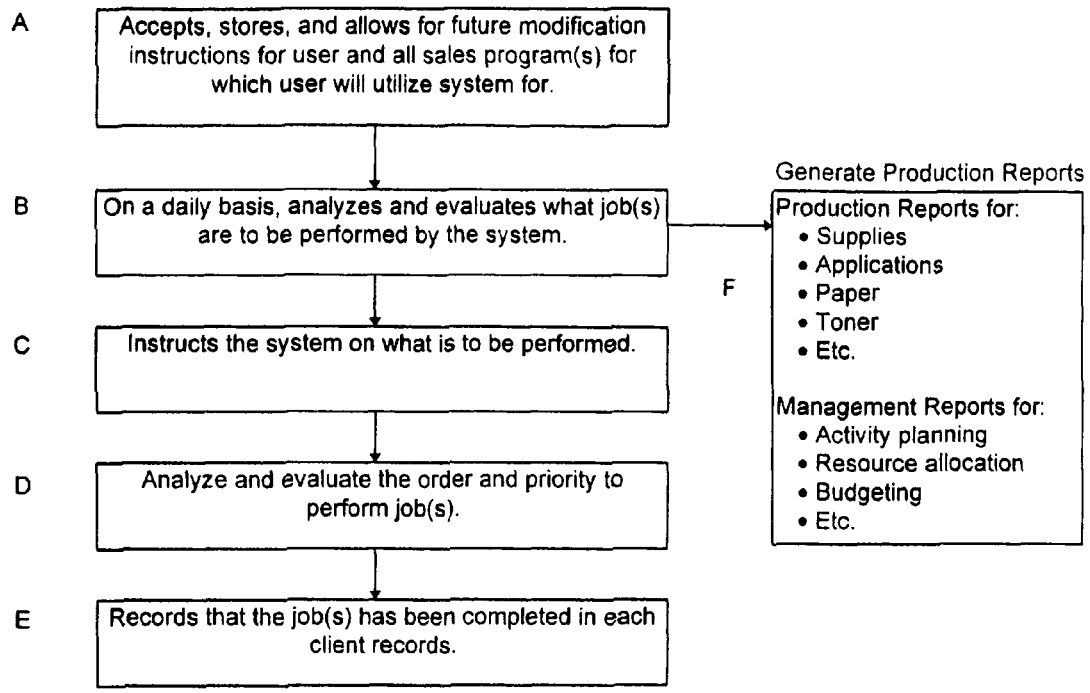
FIG. 11. is a flow chart diagram illustrating the organization and flow of the production and scheduling module of the preferred embodiment and method as depicted in FIG. 2.

In Step A of FIG. 11, the production and scheduling module accepts, stores and allows for future modification instructions for system user(s), and for all sales programs for which the system user will utilize the system. Future add-on sales programs can be easily accepted.

As shown in Step B of FIG. 11, the production and scheduling module analyzes and evaluates the jobs which are to be performed by the system. This is done on a daily basis. With this information as an input, the production and scheduling module schedules operation of the core system and instructs the system to operate accordingly, as indicated in Step C. In the course of this scheduling and the instruction, the production and scheduling module operates according to a set of predetermined criteria to determine the ordering and scheduling of the system operation and job performance.

As jobs are completed, scheduling module causes that fact to be recorded in each of the client records for which processing has been successfully completed. This is indicated in Step E of FIG. 11.

As an administrative support role, the production and scheduling module is capable of generating hard copy, readable, production reports, e.g., on a daily basis, as indicated in Step F. of FIG. 11. Production reports may be useful for system users and operators, for example, for allocating and providing sufficient supplies, paper, toner, etc. The system also is capable of generating management reports which can aid management in activity planning, resource allocation, budgeting, etc.

The production and scheduling module also is useful for automatically following up on pre-defined activities. A key attribute of the production and scheduling module is it's ability to remember a virtually unlimited number of users and user sales program(s) and implement a virtually unlimited number of instructions for the system to begin work at any point in the future.

The Sales and Financial Report and Analysis Module

The sales & financial report and analysis module ("sides module") assembles, calculates and outputs sales, test, financial and projected earnings reports. This can be done on a real-time basis with the preferred embodiment and method.

Figure 12:
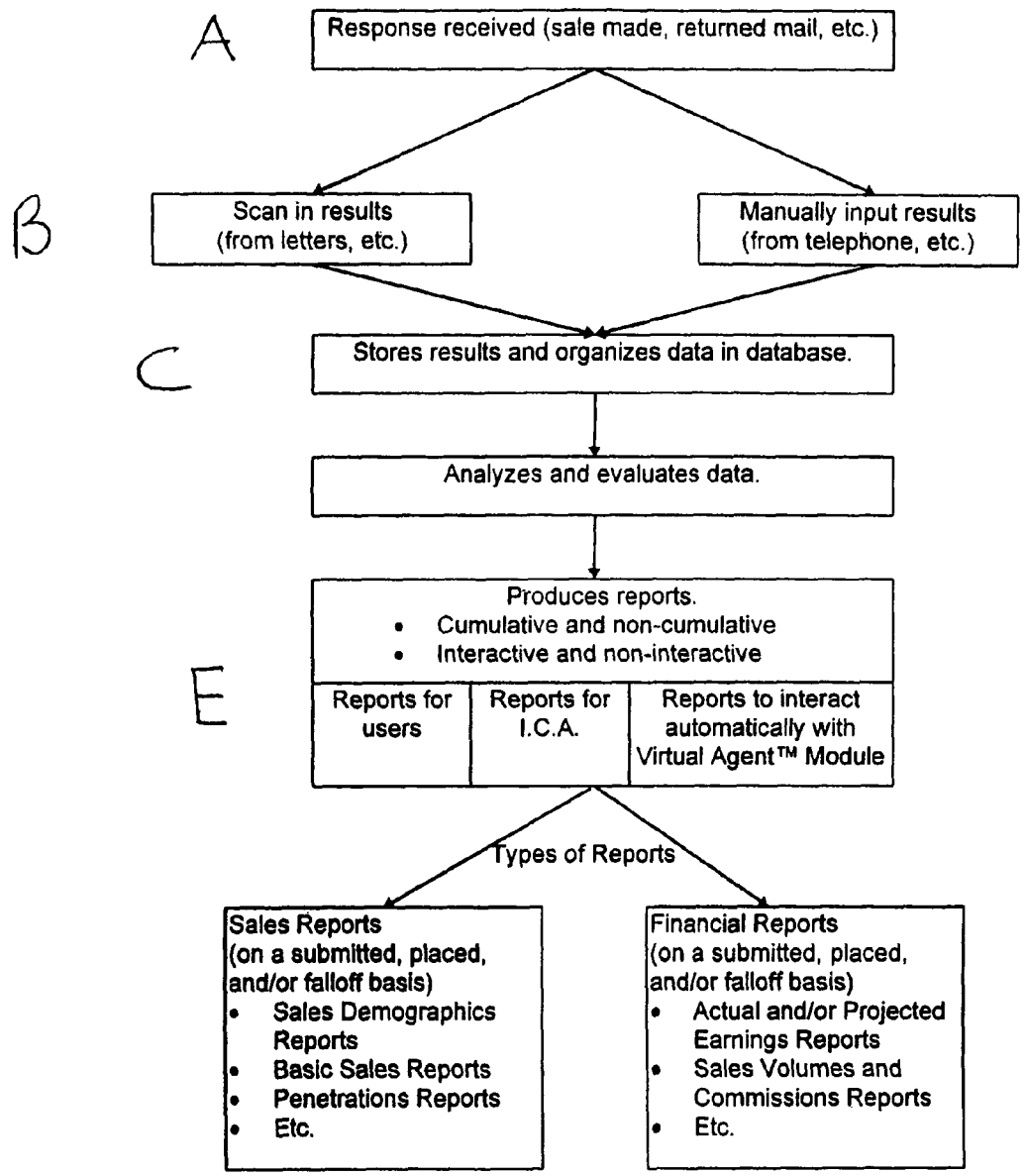
FIG. 12. is a flow chart diagram illustrating the organization and flow of the sales and financial report and analysis module of the preferred embodiment and method as depicted in FIG. 2.

A flow chart which illustrates the organization and flow of the sales and financial report and analysis module is shown in FIG. 12. As shown in that illustrative diagram, Step A involves receiving sales information based on sales of financial products actually made. In Step B, these sales results are inputted into the system, manually, by scanning, or by other methods described above which regard to the data input module. In Step C of FIG. 12, these results are stored and organized in a sales database resident in the database module.

The sales report module analyzes and evaluates this sales data, e.g., by segregating and compiling it in formats and statistical summaries useful in management. Once calculated, compiled, etc., the data may be incorporated into and reported as sales reports, as reflected in Step E of FIG. 12. These reports may be cumulative in nature or they may be non-cumulative, essentially reflecting snapshots in time. The reports also may be interactive or non-interactive, depending on the format selected, the output mode, etc. The reports may be provided to system users, management, etc. These reports also may be used in digital or automated form to interact automatically with other modules of the system, for example, the Virtual Agent™ module.

The sales reports may compile such information as sales demographics, penetration, etc. They may reflect such statistics on several basics, such as sales submitted, the number of sales actually placed, as policies and the number of sales which resulted in falloff (for which no policy was issued or taken).

The sales module also is adapted to generate financial reports. These financial reports also may reflect sales on a submitted, placed, and or falloff basis. They may be incorporated with other data to reflect actual and/or projected earnings reports, commission reports, and the like.

The Telemarketing Module

Figure 13:
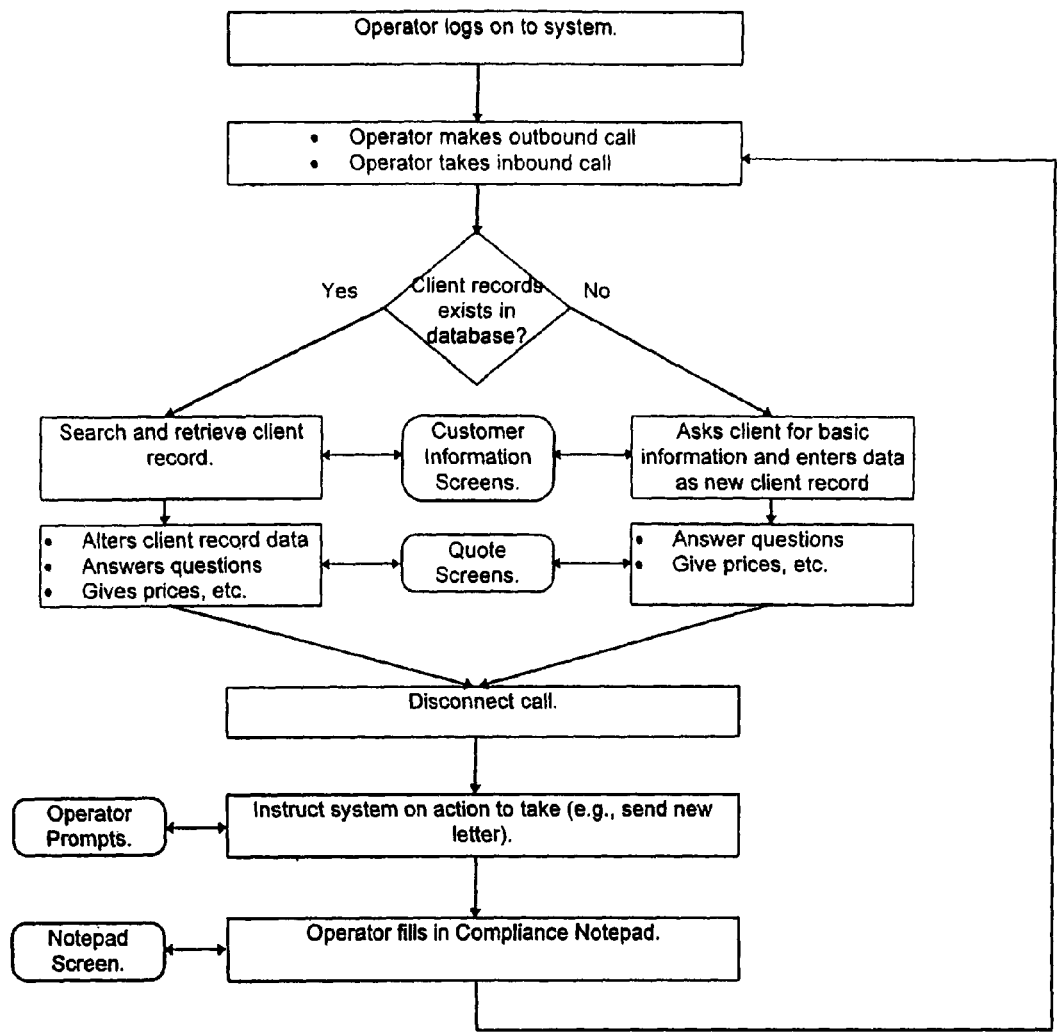
FIG. 13. is a flow chart diagram illustrating the organization and flow of the telemarketing module of the preferred embodiment and method as depicted in FIG. 2.

The system also supports a telemarketing function using the telemarketing module. An illustrative flow chart which outlines the organization and flow of the telemarketing module is shown in FIG. 13. In accordance with that flow chart, the operator would log on to the system and thereby gain access to it. Communications between the operator and clients would take place, for example, through inbound or outbound calls. For existing clients for whom a client record exists in the client database, that record would be retrieved and edited appropriately. Where no client record exists, a new one would be created as reflected in FIG. 13. In both instances, information would be entered into the system so that the client record reflects the appropriate client information. When this task is complete, the call is disconnected. At this stage, the operator may instruct the system, e.g., to schedule an input the client record for processing in the core system to generate a presentation letter. To create a record of the communication the operator would complete the compliance note pad to reflect the conversation and the events which occurred during it.

The Automated Agency and New Business Module

This "new business" module supports the processing for new business. The automated agency portion of this module supports the future policy holder service and insurance need of the client automatically. Flow chart reflecting the organization and logic of this module is shown in FIG. 14.

Figure 14:
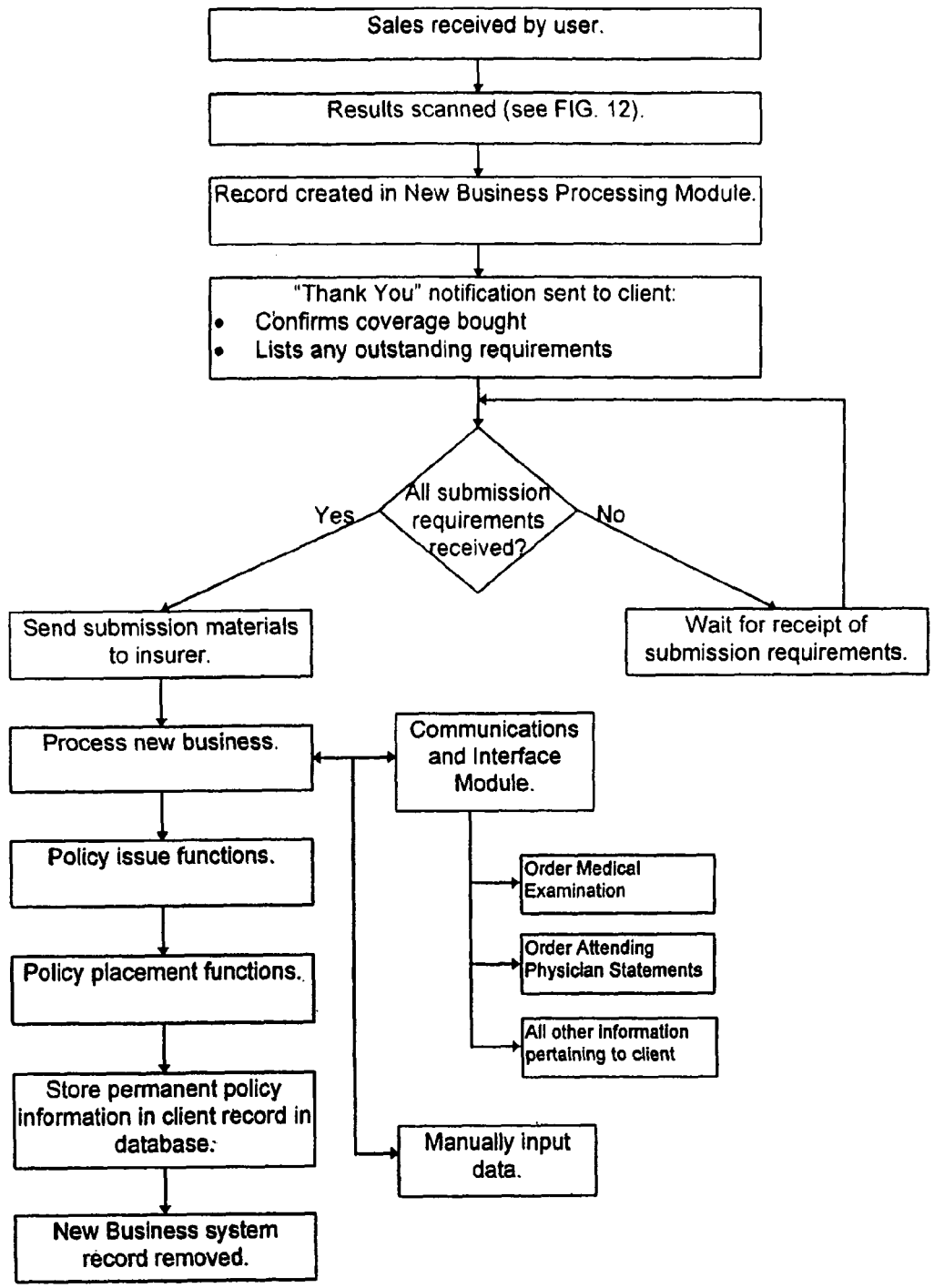
FIG. 14. is a flow chart diagram illustrating the organization and flow of the automated agency and new business processing module of the preferred embodiment and method as depicted in FIG. 2.

Referring to FIG. 14, as sales are made the sales information is received by the system user. The sale results are inputted, for example, by scanning, or by other input means, e.g., as disclosed in the discussion of the data input module. As new sales are made a corresponding client record is created in this module. The module automatically creates a "thank you" notification, which is particularized for that particular client. It confirms the products that have been purchased and the corresponding coverage. The automatically-generated communications also lists any outstanding requirements the client needs to execute to obtain product.

In addition to generating a confirming notice to the client, the system also manages the tasks, if any which correspond with sales and new business. As reflected in FIG. 14, such followup tasks may include sending submission materials to the product provider, processing the new business, e.g., from an accounting perspective, attending to function relating to issuance of the policy, placement functions, etc. Client records and other system files are updated as appropriate to reflect the sales, the correspondence of the client, etc.

In performing these tasks, it may be necessary in some instances to undertake additional communications, which may implicate the communications and interface module. These communication may be required, for example to order medical examinations, to order attending physicians statements, and to obtain all other information pertaining to the client as required under the circumstances. This module will follow-up on these requirements automatically with no human intervention.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A method for using a computer to automatically prepare a client communication having a communication format, said communication format comprising general information and client information, said general information pertaining to a first financial product or service, said general information being other than an offer for said first financial product or service, said method comprising the steps of:
    providing a client database comprising a plurality of client records, said client records comprising client information;
    providing a product-related database comprising product information;
    using a processor to:
        select a client record from said client database;
        determine variable content for inclusion in a client communication to be directed to a particular client associated with said client record, said variable content pertaining to an offer for a second financial product or service and including portions of said client information contained in said particular client's client record and portions of product information from said product-related database, said portions of product information specific to said client;
        generate said portions of client information, said portions of product information, and said general information instantaneously and according to said communication format;
        compose said general information, said portions of product information, and said portions of client information to form said client communication; and
        automatically repeat said steps to select, determine, generate and compose for each suitable client record, from said client database, without human intervention between each step for a particular client record and between successive client records.

2. The method of claim 1, wherein said communication format comprises an offer portion, a product/service information portion and a fulfillment portion, wherein said product/ service information portion comprises information pertaining to said second financial product or service enabling said client to make an informed decision regarding said second financial product or service, and wherein said fulfillment portion enables said client to obtain said second financial product or service, or directs said client on how to obtain said second financial product or service or information relating thereto.

3. The method of claim 2, wherein said offer is located on a page of said client communication other than a first page of said client communication.

4. The method of claim 2, wherein information in said product/service information portion includes information required by compliance standards to offer said second financial product or service for sale.

5. The method of claim 2, wherein information in said product/service information portion includes information required by applicable regulations to offer said second financial product or service for sale.

6. The method of claim 1, wherein said variable content does not pertain to said first financial product or service.

7. The method of claim 1, wherein said variable content pertains to both said first financial product or service and said second financial product or service.

8. The method of claim 1, wherein said variable content pertains to terms of said second financial product or service.

9. The method of claim 1, wherein said composing step includes the step of adjusting at least one of a layout and said format of said client communication depending on content of said offer.

10. The method of claim 1, wherein said composing step includes the step of including said variable content into said offer such that said offer does not include any excess spaces adjacent to said variable content.

11. The method of claim 1, wherein said determining step comprises calculating a portion of said variable content.

12. A method for using a computer to automatically prepare a client communication, said client communication comprising general information and client information, said general information pertaining to a first financial product or service, said method comprising the steps of:
　providing a client database comprising a plurality of client records, said client records comprising client information;
　providing a product-related database comprising product information;
　using a processor to:
　　select a client record from said client database;
　　determine variable content for inclusion in a client communication to be directed to a particular client associated with said client record, said variable content including at least some information required by compliance standards to offer a second financial product or service for sale and including portions of said client information contained in said particular client's client record and portions of product information from said product-related database, said portions of product information specific to said client;
　　generate said portions of client information, said portions of product information, and said general information instantaneously;
　　compose said general information, said portions of product information, and said portions of client information to form said client communication; and
　　automatically repeat said steps to select, determine, generate and compose for each suitable client record, from said client database, without human intervention between each step for a particular client record and between successive client records.

13. The method of claim 12, wherein said variable content includes at least some information required by applicable regulations to offer said second financial product or service for sale.

14. A method for using a computer to automatically prepare a client communication, said client communication comprising general information and client information, said general information pertaining to a first financial product or service, said method comprising:
　providing a client database comprising a plurality of client records, said client records comprising client information;
　providing a product-related database comprising product information;
　using a processor to
　　select a client record from said client database;
　　determine variable content for inclusion in a client communication to be directed to a particular client associated with said client record, said variable content relating to one or more plans applicable to a second financial product or service and including portions of said client information contained in said particular client's client record and portions of product information from said product-related database, said portions of product information specific to said client;
　　generate said portions of client information, said portions of product information, and said general information instantaneously;
　　compose said general information, said portions of product information, and said portions of client information to form said client communication; and
　　automatically repeat said steps to select, determine, generate and compose for each suitable client record, from said client database, without human intervention between each step for a particular client record and between successive client records.

15. The method of claim 14, wherein each plan has one or more features relating to said second financial product or service.

16. The method of claim 15, wherein features of said plans vary from plan to plan.

17. The method of claim 14, further comprising the step of: using said processor to design said plans for said client.

18. The method of claim 14, further comprising the step of: using said processor to select said plans for said client.

19. A method for using a computer to automatically prepare a client communication, said client communication comprising general information and client information, said general information pertaining to a first financial product or service, said method comprising:
　providing a client database comprising a plurality of client records, said client records comprising client information;
　providing a product-related database comprising product information;
　using a processor to:
　　select a client record from said client database;
　　select a second financial product or service from said product-related database;
　　determine variable content for inclusion in a client communication to be directed to a particular client associated with said client record, said variable content relating to an offer for said second financial product or service and including portions of said client information contained in said particular client's client record and portions of product information from said product-related database, said portions of product information specific to said client;

generate said portions of client information, said portions of product information, and said general information instantaneously;

compose said general information, said portions of product information, and said portions of client information to form said client communication; and automatically repeat said steps to select a client record, select a second financial product or service, determine, generate and compose for each suitable client record, from said client database, without human intervention between each step for a particular client record and between successive client records.

20. A method for using a computer to automatically prepare a client communication, said client communication comprising general information and client information, said general information pertaining to a first financial product or service, said method comprising the steps of:

providing a client database comprising a plurality of client records, said client records comprising client information;

providing a product-related database comprising product information;

using a processor to:

select a client record from said client database;

select one or more plans applicable to a second financial product or service from said product-related database;

determine variable content for inclusion in a client communication to be directed to a particular client associated with said client record, said variable content relating to an offer for said selected one or more plans applicable to said second financial product or service and including portions of said client information contained in said particular client's client record and portions or product information from said product-related database, said portions of product information specific to said client;

generate said portions of client information, said portions of product information, and said general information instantaneously;

compose said general information, said portions of product information, and said portions of client information to form said client communication; and automatically repeat said steps to select a client record, select one or more plans, determine, generate and compose for each suitable client record, from said client database, without human intervention between each step for a particular client record and between successive client records.

21. A method for using a computer to automatically prepare a client communication, said client communication comprising general information and client information, said general information pertaining to a first financial product or service, said method comprising:

providing a client database comprising a plurality of client records, said client records comprising client information;

providing a product-related database comprising product information;

using a processor to:

select a client record from said client database;

determine variable content for inclusion in a client communication to be directed to a particular client associated with said client record, said variable content pertaining to an offer for a second financial product or service and including portions of client information contained in said particular client's client record and portions of product information from said product-related database, said portions of product information specific to said client;

generate said portions of client information, said portions of product information, and said general information instantaneously;

compose said general information, said portions of product information, and said portions of client information to form said client communication, wherein said client communication comprises content sufficient to enable a customer to make an informed decision regarding said second financial product or service; and automatically repeat said steps to select, determine, generate and compose for each suitable client record, from said client database, without human intervention between each step for a particular client record and between successive client records.

22. The method of claim 21, wherein said content sufficient to enable a customer to make an informed decision includes compliance related information.

* * * * *